United States Patent [19]

Hori et al.

[11] Patent Number: 5,093,867

[45] Date of Patent: Mar. 3, 1992

[54] CANDIDATE ARTICLE RECOGNITION WITH ASSIGNATION OF REFERENCE POINTS AND RESPECTIVE RELATIVE WEIGHTS

[75] Inventors: Kazuhito Hori, Tokyo; Yasuyuki Nagata, Saitama, both of Japan

[73] Assignee: Sony Corporation, Tokyo, Japan

[21] Appl. No.: 569,513

[22] Filed: Aug. 20, 1990

Related U.S. Application Data

[63] Continuation of Ser. No. 215,530, Jul. 6, 1988, abandoned.

[30] Foreign Application Priority Data

| Jul. 22, 1987 | [JP] | Japan | 62-183019 |
| Aug. 11, 1987 | [JP] | Japan | 62-200503 |
| Aug. 13, 1987 | [JP] | Japan | 62-202539 |
| Aug. 14, 1987 | [JP] | Japan | 62-202778 |

[51] Int. Cl.$^5$ .................. G06K 9/00; G06K 9/46; G06K 9/62; G06K 9/50
[52] U.S. Cl. ............................ 362/8; 382/23; 382/30; 382/14
[58] Field of Search ............ 382/8, 23, 30, 34, 14, 382/45, 50, 65, 36

[56] References Cited

U.S. PATENT DOCUMENTS

| 3,321,637 | 5/1967 | Beltz et al. | 382/50 |
| 3,614,736 | 10/1971 | McLaughlin | 382/30 |
| 3,692,983 | 9/1972 | Cucciati et al. | 382/50 |
| 4,034,343 | 10/1976 | Wilmer | 382/45 |
| 4,748,676 | 5/1988 | Miyagawa | 382/28 |
| 4,803,735 | 10/1986 | Mishida | 382/8 |

OTHER PUBLICATIONS

William Naylor, "Some Studies In The Interactive Design of Character Recognition Machines", IEEE Transactions on Computers 1971, pp. 1075-1086.

*Primary Examiner*—Leo H. Boudreau
*Assistant Examiner*—Michael R. Cammarata
*Attorney, Agent, or Firm*—Lewis H. Eslinger; Jay H. Maioli

[57] ABSTRACT

A high-speed image recognition system operates in response to a binary digitized picture image signal. The system comprises a first memory for storing a bi-level reference image pattern therein, a selector coupled to the first memory for manually designating a plurality of selected points of the bi-level reference image pattern, a detector coupled to the selector for detecting signal levels at each of the points selected by the selector, a second memory coupled to the detector for storing therein detected signal levels obtained from the detector, and a comparator coupled to the second memory for comparing the detected signal levels at the selected points of the bi-level reference image pattern with signal levels at the same points of a candidate image pattern, whereby an object corresponding to the candidate image pattern is recognized.

5 Claims, 25 Drawing Sheets

FIG. 5A
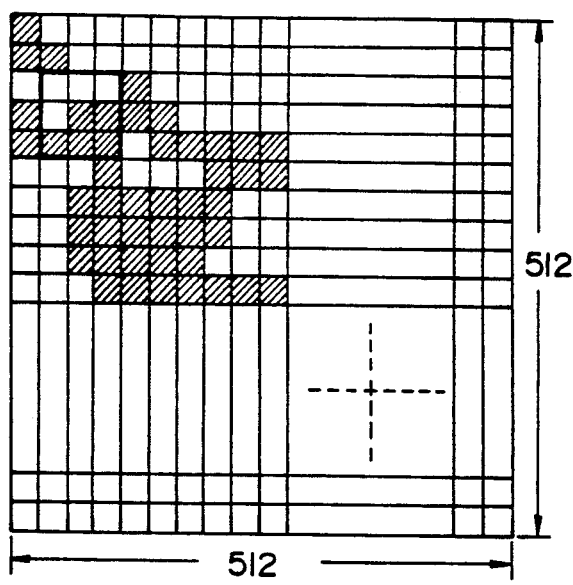
FIG. 5B
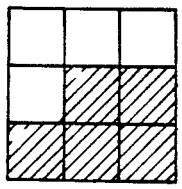
FIG. 5C  FIG. 5D
FIG. 6
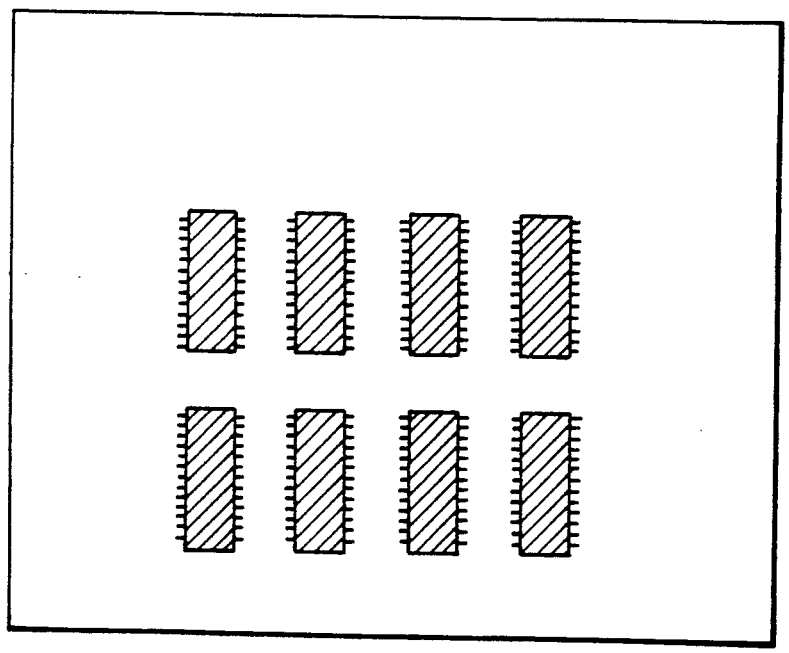

CANDIDATE ARTICLE RECOGNITION WITH ASSIGNATION OF REFERENCE POINTS AND RESPECTIVE RELATIVE WEIGHTS

This is a continuation of application Ser. No. 07/215,530, filed July 6, 1988 now abandoned.

BACKGROUND OF THE INVENTION

1. Field of the Invention

This invention relates to an image recognition system for recognizing an image by bi-level picture processing. More particularly, it relates to an image recognition system wherein recognition of the presence, shape, orientation and so on of an article is enabled by constituting the system in such a way that master data consisting of points designated by an operator are registered in the system in order to teach the system important features of the article, and data of a candidate article are compared with the master data during execution of a recognition algorithm.

2. Description of the Prior Art

In manufacturing certain goods, for example electronic appliances, parts are sometimes arranged in a row on a palette and forwarded on a belt conveyor for assembly. Occasionally some of the parts on the palette are missing because of a malfunction of a machine for arranging such parts or for some other reason.

To deal with this problem, a system has been proposed wherein an image of parts on a palette is picked up by a video camera, and the resulting video signals are processed in order to detect whether any parts are missing. For this purpose it is not necessary to discern minute structural details; it is only necessary to determine whether or not all of the required parts are present. Accordingly, such video signals may be bi-level signals of black and white levels, and processing of a picture image may be made on the basis of such bi-level signals.

However, in most conventional systems of the type mentioned, the user cannot set the conditions for judgment; accordingly, such conventional systems are inflexible and difficult to use. For example, since the reference level for discriminating between white and black of a candidate article cannot be set by the user, it is not possible to make appropriate allowance for variations in coloration and illumination of a candidate article. Accordingly, the reliability in judgment is so low that errors readily occur.

Further, pattern matching for recognizing the shape of an article is performed commonly by a template matching method. However, since in the template matching method a master pattern registered in advance is scanned over an entire area of a television picture plane in a search for a coincident pattern, it is necessary, for example, in the case of recognition of characters, to scroll the picture plane character by character. Accordingly, a great deal of time is required for recognition.

Besides, there is a practical limit to the number of different sizes and shapes of master patterns Accordingly, the conventional systems lack versatility and are not easy to use.

OBJECTS AND SUMMARY OF THE INVENTION

An object of the present invention is to provide a novel image recognition system that has a high speed of response.

Another object of the invention is to provide an image recognition system that operates in response to a binary digitized picture image signal.

In an image pattern recognition system according to the present invention, marks are applied to a reference pattern, and a pattern for inspection is compared with the reference pattern as marked in order to judge the presence, shape, orientation or the like of the pattern for inspection.

In particular, according to the present invention, there is provided image recognition apparatus for recognizing a condition of a candidate article with respect to a reference condition, the apparatus comprising: first memory means for storing a bi-level reference image; display means connected to the first memory means for displaying the reference image; selecting means connected to the first memory means and the display means for manually designating a plurality of selected reference points of the reference image; detecting means connected to the selecting means for detecting signal levels at each of the reference points; second memory means connected to the detecting means for storing the detected signal levels; and comparison means connected to the second memory means for making a comparison of the detected signal levels with bi-level signals at points that correspond to the reference points but are proper to a bi-level candidate image corresponding to a candidate article; the comparison indicating a condition of the candidate article with respect to a corresponding condition of the reference image, and the display means displaying the results of the comparison.

With an image recognition system constructed in accordance with the invention, the objects of the present invention specified above can be attained.

The image recognition system of the present invention has various applications including detection of the absence or mislocation of a part or element among parts or elements arranged in a predetermined fashion and other applications described below.

The preceding and other objects, features and advantages of the present invention will become apparent from the following description and the appended claims taken in conjunction with the accompanying drawings.

BRIEF DESCRIPTION OF THE DRAWINGS

FIGS. 5A to 5D are diagrammatic representations illustrating a method of judging between white and black by the image recognition system of the first embodiment;

FIGS. 6 to 10 are schematic illustrations showing picture planes when the presence of required parts is judged by the image recognition system of the first embodiment;

DESCRIPTION OF THE PREFERRED EMBODIMENTS

Figure 1:
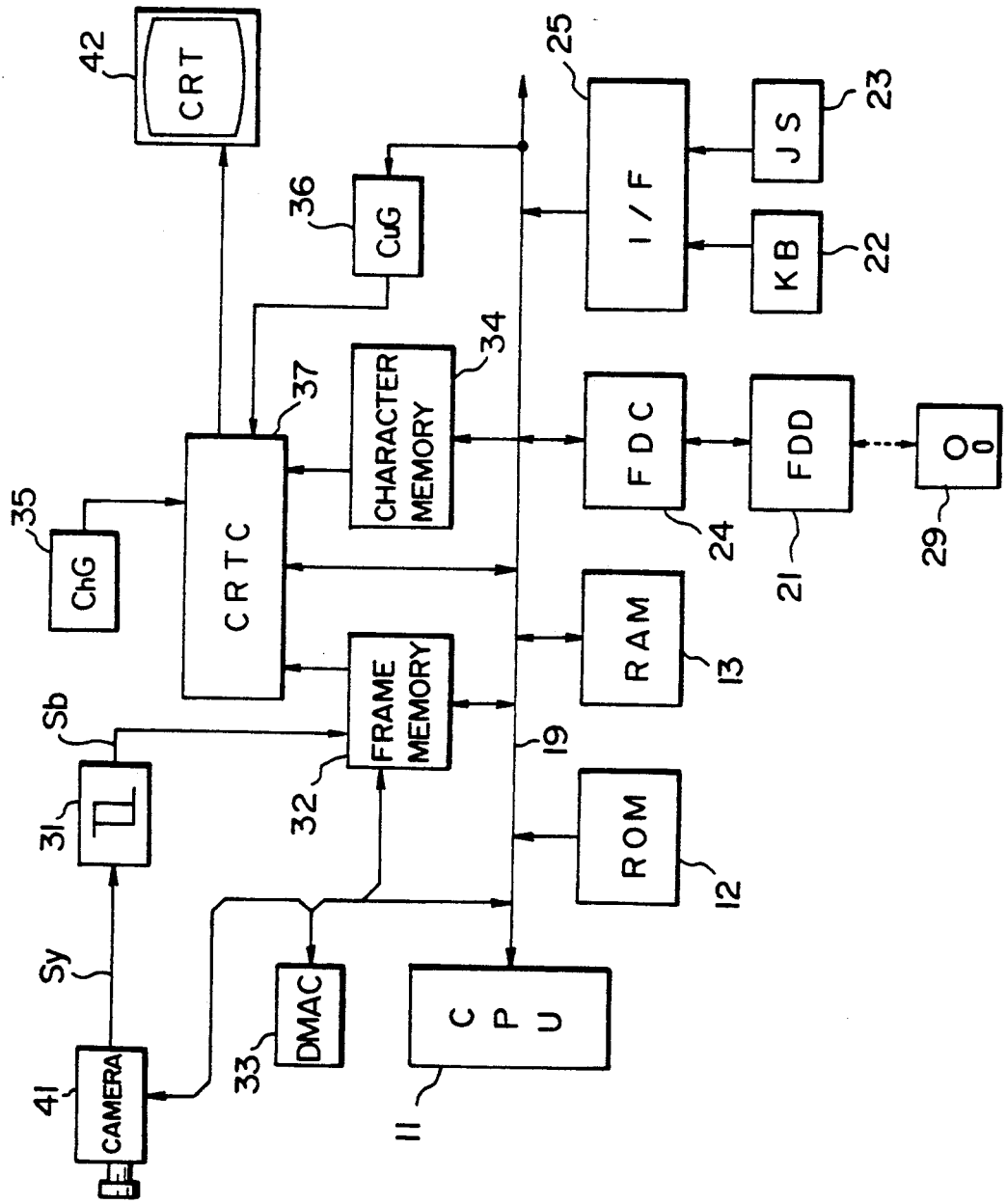
FIG. 1 is a block diagram showing a basic hardware construction of an image recognition system according to the present invention.
Figure 2:
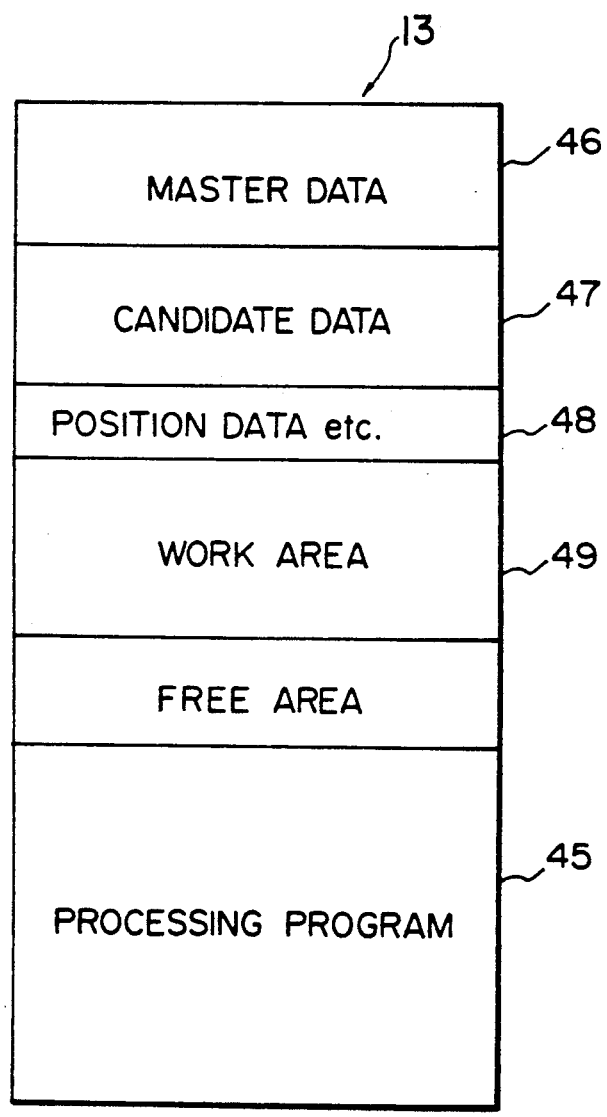
FIG. 2 is a memory map of a RAM (random access memory) of the image recognition system of FIG. 1.

FIG. 1 shows a basic hardware construction of an image recognition system according to the present invention. The image recognition system shown includes a 16-bit CPU (central processing unit) 11 for controlling the operation of the entire system, a ROM (read only memory) 12 in which a BIOS (Basic input/output system) and certain other information are permanently stored, and a RAM (random access memory) 13 in which various programs and data are reloadably stored. The RAM 13 may be divided, for example, into a processing program area 45 (FIG. 2) in which a processing program for making judgments is stored, a master data area 46 in which master data are stored, a candidate data area 47 in which data relating to a candidate for recognition and so on are stored during execution of the recognition algorithm, a temporary data area 48 in which temporary data such as position data are stored, and a work area 49 for the CPU 11. The memories 12 and 13 are connected to the CPU 11 over a system bus 19 (FIG. 1).

Figure 3:
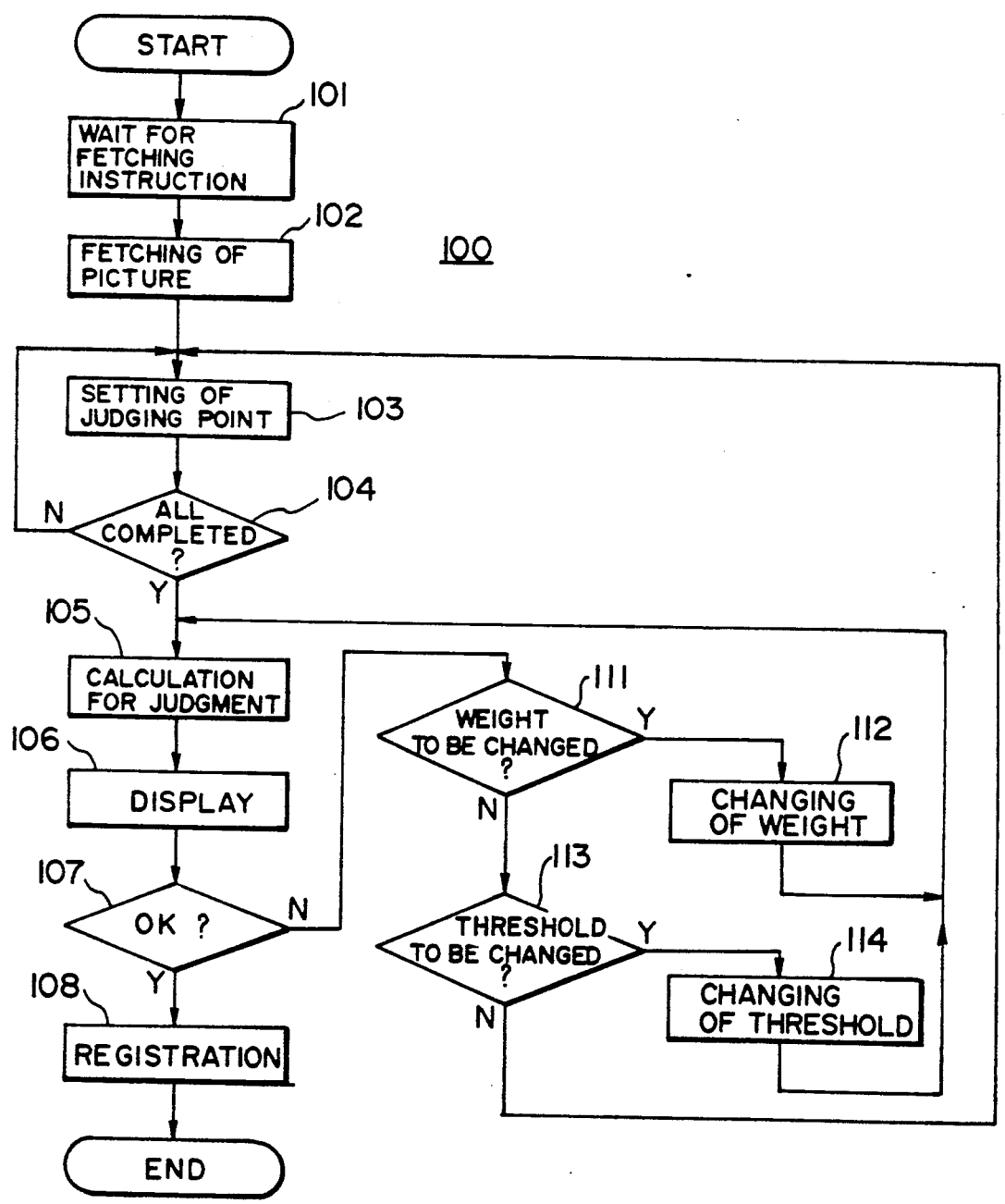
FIGS. 3 and 4 are flow charts showing operation of the image recognition system of FIG. 1 in a first preferred embodiment of the present invention.
Figure 4:
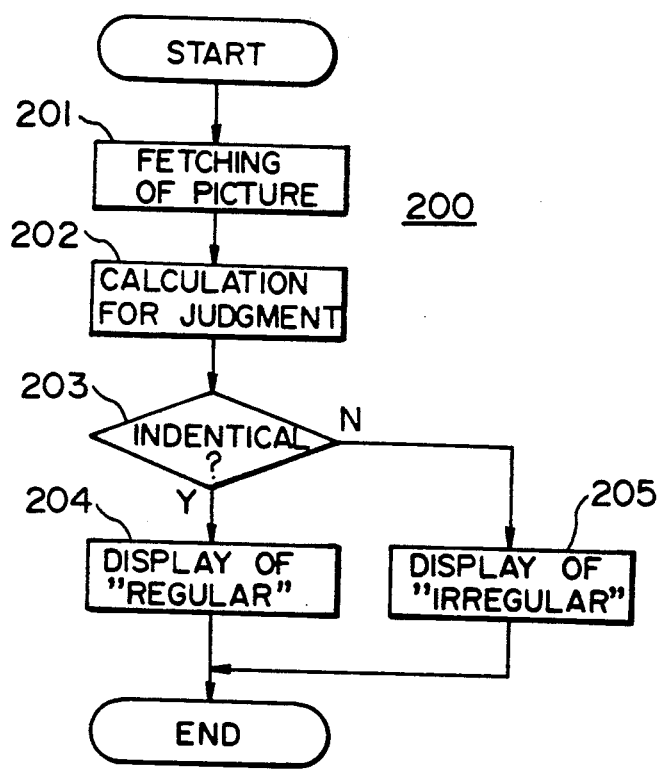
Figure 7:
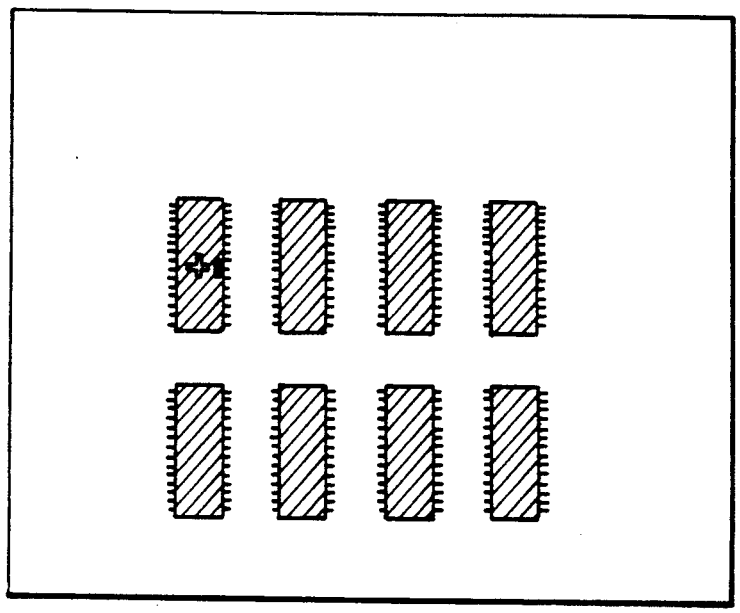

The image recognition system further includes an FDD (floppy disk drive) 21 connected to the system bus 19 via an FDC (floppy disk controller) 24, and a keyboard (KB) 22 and a joystick (JS) 23 both connected to the bus 19 via an interface (I/F) 25. Programs such as 100 and 200 illustrated in the flow charts of FIGS. 3 and 4, respectively, and forming part of the aforementioned processing program for judgment are saved on a floppy disk 19 from which the programs are read by means of the FDD 21.

The image recognition system further includes a video camera 41 for picking up an image of a reference article and a candidate article. A brightness signal Sy is developed from the camera 41 and supplied to a binary digitizing circuit 31 by which it is converted into a bi-level signal Sb which has a "0" level (white level) when the brightness signal Sy is displaced toward the white level side with respect to a predetermined threshold level and has a "1" level (black level) when the brightness signal Sy is displaced toward the black level side with respect to the predetermined threshold level. The bi-level signal Sb is supplied to a frame memory 32.

The frame memory 32 is provided to store therein such signals Sb for one complete frame with a resolution of 512 picture elements ×512 picture elements. Such signals Sb are loaded into the memory 32 by DMA (direct memory access) transmission in sychronism with horizontal and vertical synchronizations of the signals Sb by a DMA controller 33.

The image recognition system further includes a character memory 34 and a character generator (ChG) 35. The memory 34 has a so-called V-RAM (video RAM) construction and enables a letter, number or mark to be displayed on a monitor image receiver 42 when a corresponding character code is loaded into the memory 34 from the character generator (ChG) 35. The image recognition system further includes a cursor generator (CuG) 36 for forming a signal to be displayed as a cursor, and a CRT (cathode ray tube) controller 37 for controlling the circuits 32 and 34 to 36 and for combining output signals of the circuits to produce display signals to be supplied to and displayed on the monitor image receiver 42.

When the image recognition system of a first preferred embodiment of the present invention is turned on, the programs 100 and 200 (FIGS. 3 and 4) saved on the floppy disk 29 (FIG. 1) are loaded into the RAM 13 (FIGS. 1 and 2), and then the system enters a command waiting condition.

If a teaching mode is thereafter called up by way of the keyboard 22 (operation [1]), the program 100 is executed.

In particular, after starting of the program 100, the CPU 11 (FIG. 1) enters, at first at step 101 (FIG. 3), a condition in which it waits for the input of an instruction to enable the frame memory 32 to fetch bi-level signals Sb. Thus, preparations are made here to pick up an image of one or more parts arranged for scanning by means of the video camera 41.

Then, if a fetching instruction is supplied as an input by way of the keyboard 22 (operation [2]), the program of the CPU 11 advances to step 102, at which fetching of signals Sb is enabled so that signals Sb for one frame are successively fetched into the frame memory 32 by DMA transmission. The signals Sb thus fetched are then recalled from the frame memory 32 by the CRT controller 37 and supplied to the monitor image receiver 42, on which a master image constituting a reference as shown in FIG. 6 is displayed.

Subsequently, the program of the CPU 11 advances to step 103, at which a judging point is set. In particular, signals from the cursor generator 36 and the character generator 35 are supplied to the monitor image receiver 42, on which a cursor and a number of judging points are displayed. The user of the system can change the position of the cursor on the picture plane of the monitor image receiver 42 at will by operation of the joystick 23 (operation [3]).

When a judging point is selected, it is supplied as an input by way of the keyboard 22 (operation [4]). Then, the program advances to step 104, at which it is determined whether or not setting of all of the required judging points has been completed. If information supplied as an input by way of the keyboard 22 indicates that setting of all of the judging points has not yet been completed, the program returns to step 103, at which setting of another judging point is executed (operation

Figure 8:
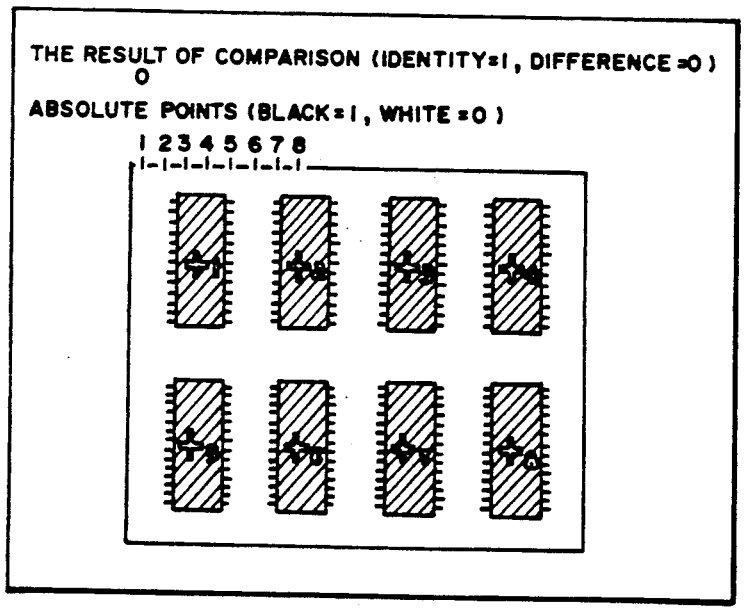

[5]). On the other hand, in case the input supplied at step 104 indicates that setting of all of the judging points has been completed (operation [6]), the program advances to step 105, at which an evaluation value Ev is calculated for each of the set judging points and compared with a threshold level $E_{TH}$ to form master data indicating that the judging point is either white or black. Subsequently, at step 106, signals conforming to the results of step 105 are fetched from the character generator 35 and supplied to the monitor image receiver 42, on which the master data are thus displayed as shown in FIG. 8.

The program thereafter advances to step 107, at which the display is caused to inquire of the operator of the system whether or not the master data displayed are acceptable. If the operator supplies as an input by way of the keyboard 22 a signal indicating that the master data are acceptable (operation [7-A]), the program advances to step 108, at which the master data, the position data of the judging points, the weights of individual picture elements of the judging points and the threshold level $E_{TH}$ are registered in the RAM 13. The program 100 is thus completed, and the CPU 11 again enters the command waiting condition.

On the other hand, if at step 107 the operator supplies as an input by way of the keyboard 22 a signal indicating that the master data displayed are not acceptable (operation [7-B]), the program advances to step 111, at which an inquiry is made of the operator whether or not the distribution of the weights accorded to the judging points is to be changed. In case the operator supplies as an input by way of the keyboard 22 a signal indicating that the distribution is to be changed, the program advances to step 112, and then if new weights are supplied as inputs by way of the keyboard 22, the program returns to step 105. Accordingly, new evaluation values Ev and new master data are subsequently formed successively in accordance with the new weights at steps 105 and 106, respectively, and then confirmation of the new master data is requested at step 107.

If the input supplied at step 111 indicates that the distribution of the weights is not to be changed, the program advances to step 113, at which an inquiry is made of the operator whether or not the threshold level $E_{TH}$ is to be changed. If the response is affirmative, the program advances to step 114. If a new threshold level ETH is supplied as an input by way of the keyboard 22 at step 114, the program returns to step 105. Accordingly, new master data are subsequently formed in accordance with the new threshold level $E_{TH}$ and then at step 107, confirmation of the new master data is requested again.

If the signal supplied as an input at step 113 indicates that the threshold level $E_{TH}$ is not to be changed, the program returns to step 103 in order thereafter to execute the setting of a new judging point.

In this manner, according to the program 100, judging points can be set arbitrarily, and master data can be formed with an arbitrary weight distribution and an arbitrary threshold level $E_{TH}$ for the judging points thus set.

When a judgment executing mode is established by way of the keyboard 22 (operation [11]), the program 200 is executed for each of different types of candidate parts to pass judgement on each candidate part.

In particular, after starting of the program 200, fetching of bi-level signals Sb corresponding to a candidate part or parts is enabled at step 201 (this is similar to the operation at step 102). Consequently, signals Sb for one frame are fetched into the memory 32 by DMA transmission. The signals Sb thus fetched are taken out by the CRT controller 37 and supplied to the monitor image receiver 42, on which an image of the candidate parts is displayed as shown in FIG. 6.

Subsequently, the program of the CPU 11 advances to step 202, at which the position data and weights of the judging points and the threshold level $E_{TH}$ are fetched from the RAM 13 and an evaluation value Ev is calculated, as at step 105, for each of the judging points designated at step 103 and compared with the threshold level $E_{TH}$ to form candidate data indicating that the judging point is either white or black. Then at step 203, the master data produced at step 105 are compared with the candidate data produced at step 202.

Figure 9:
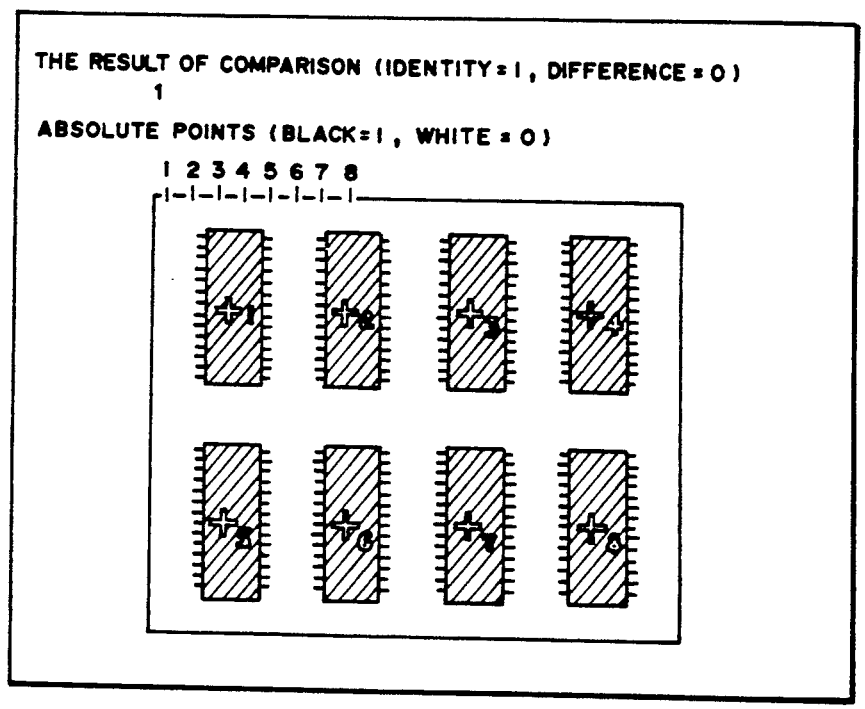

In case it is found at step 203 the master data coincide completely with the candidate data, the program advances to step 204, at which a font datum of "1" representative of a regular condition is fetched from the character generator 35 and supplied to the monitor image value "1" representative of a regular condition on the second line of the picture plane (FIG. 9). It further displays judging point numbers "1" to "8" and, on the fifth line of the picture plane, numerals of the value "1" representing that the judging point is white.

Figure 10:
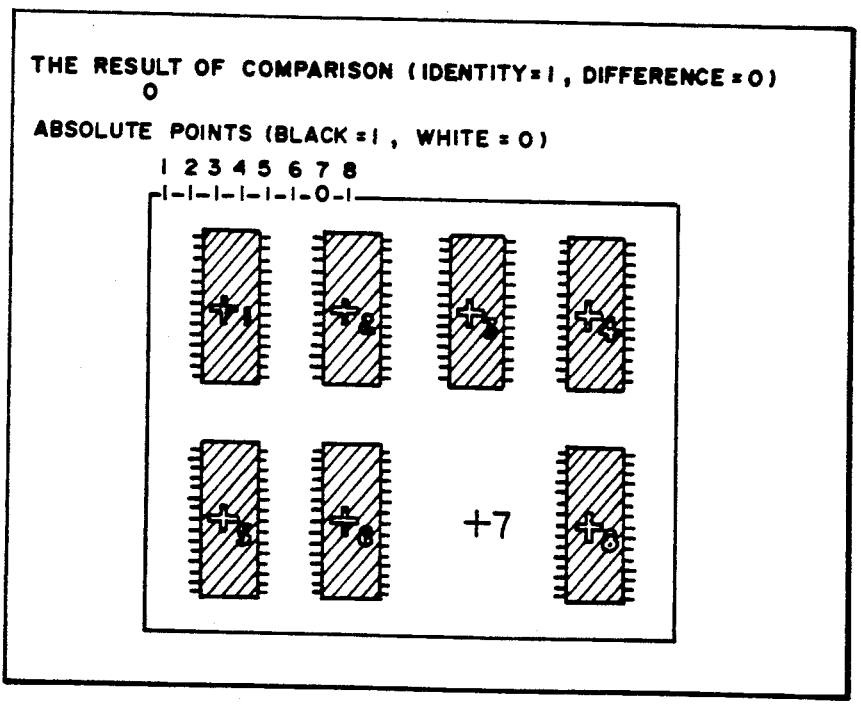

On the other hand, in case there is some difference between the master data and the candidate data at step 203, the program advances to step 205, at which a font datum of "0" representative of an irregular condition is fetch from the character generator 35 and supplied to the monitor image receiver 42. The monitor image receiver 42 displays the value "0" representative of an irregular condition on the second line of the screen (FIG. 10). It further displays judging point numbers "1" to "8" and, on the fifth line of the screen, numerals of the respective values "0" and "1" each representing that the judging point is black or white.

The judgment is thus completed for particular parts, and thereafter each time parts are presented for inspection, the program 200 is executed to make the required judgments.

The image recognition system operates as described above. Such operation is recapitulated below in connection with a description of manual operation of the system as illustrated in FIGS. 6 to 12, which show binary digitized black and white picture images displayed on the monitor 42.

Operation [1]: At first, a command is supplied as an input by way of the keyboard to put the system into the teaching mode.

Operation [2]: Subsequently, another command is supplied as an input by way of the keyboard, and parts which are arranged to constitute a reference are scanned by the video camera so as to display them on the monitor image receiver as shown in FIG. 6.

In FIG. 6, up to 8 LSIs (large scale integrated circuits) are shown arranged in 2 rows by 4 columns on a palette.

Operation [3]: Subsequently, the joystick is manually operated to move the cursor of a cross mark to the position of a mark on the first LSI in the first row of the first column.

The position of the cursor then establishes a judging point as to which a judgment of the presence or absence of a part is to be made. Since this is the first judging point to be set, a judgment number (cursor number) "1" is displayed near the cursor.

Operation [4]: If a judging point is selected, then this information is supplied as an input by way of the keyboard.

Operation [5]: Subsequently, the operations [3] and [4] described above are repeated for the second to eighth LSIs until judging points are set for all of the LSIs.

Operation [6]: Since the setting of the judging points for all of the LSIs is thus completed, this information is supplied as an input by way of the keyboard. Thereupon, the master data for the judging points are displayed as shown in FIG. 8.

The numerals "1" to "8" on the fourth line of the display denote the judging point numbers. The numeral "1" displayed below any of the numerals (on the fifth line of the display) indicates that the corresponding judging point is black; where the corresponding judging point is white, the numeral "0" is displayed instead of the numeral "1".

Operation [7-A]: When the master data are acceptable, this information is supplied as an input by way of the keyboard, thereby ending the teaching mode.

Operation [7-B]: In case the master data displayed are not acceptable, this information is supplied as an input by way of the keyboard, and then the weights or the threshold level for judgment between white and black is set again. Afterwards, the sequence of operations beginning with operation [3] is performed again.

The teaching mode is thus completed, and the master data for a reference are obtained.

On the other hand, when judgment of the acceptability of candidate articles such as LSIs is to be made, the following operations are performed:

Operation [11]: At first, a command is supplied as an input by way of the keyboard to put the system into a judgment executing mode.

Operation [12]: Thereafter, each time an image of candidate articles such as LSIs is picked up by the video camera, the picture image of the results of the judgment made is displayed as shown in FIG. 9 or 10.

FIG. 9 illustrates candidate LSIs arranged in a regular manner, and the value indicating that there are no missing LSIs (i.e., the data presented for judgment is coincident with the master data) is displayed on the second line of the display. The value "1" indicating that the judging point is black is displayed (on the fifth line of the display) below each of the judging point numbers "1" through "8" on the fourth line of the display.

FIG. 10 illustrates candidate LSIs in a case where the seventh LSI is missing. The value "0" indicating a shortage of LSIs (i.e., the data presented for judgment is not coincident with the master data) is displayed on the second line of the display, the value "1" indicating that the judging point is black is displayed (on the fifth line of the display) below each of the judging point numbers "1" to "6" and "8" on the fourth line of the display, and the value "0" indicating that the judging point is white and accordingly no LSI is present is displayed (on the fifth line of the display) below the judging point number "7" on the fourth line of the display.

The status of the LSIs on a given palette is judged in this manner.

Figure 11:
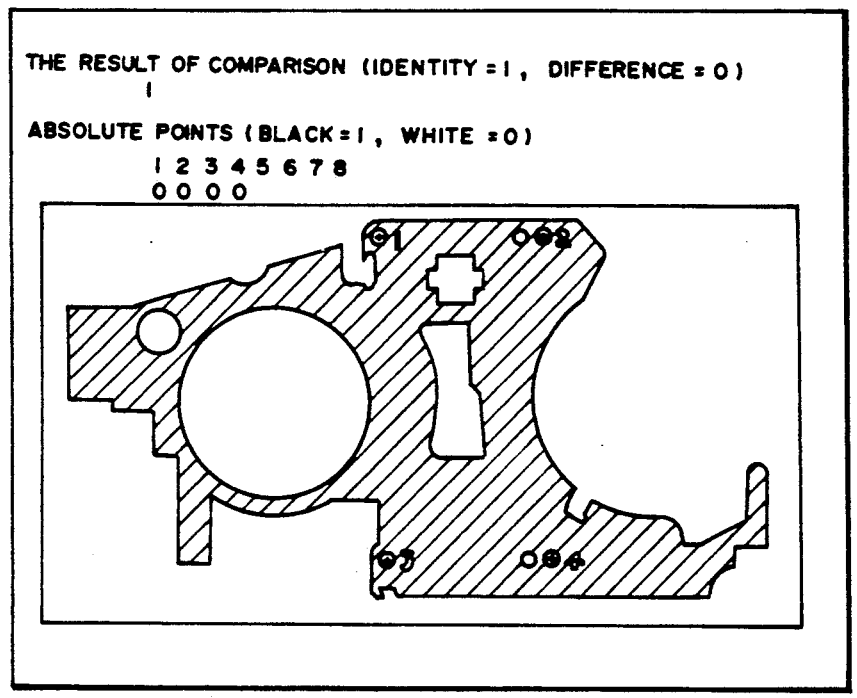
FIGS. 11 and 12 are schematic illustrations showing picture planes when the presence of perforations in a part is judged by the image recognition system of the first embodiment.
Figure 12:
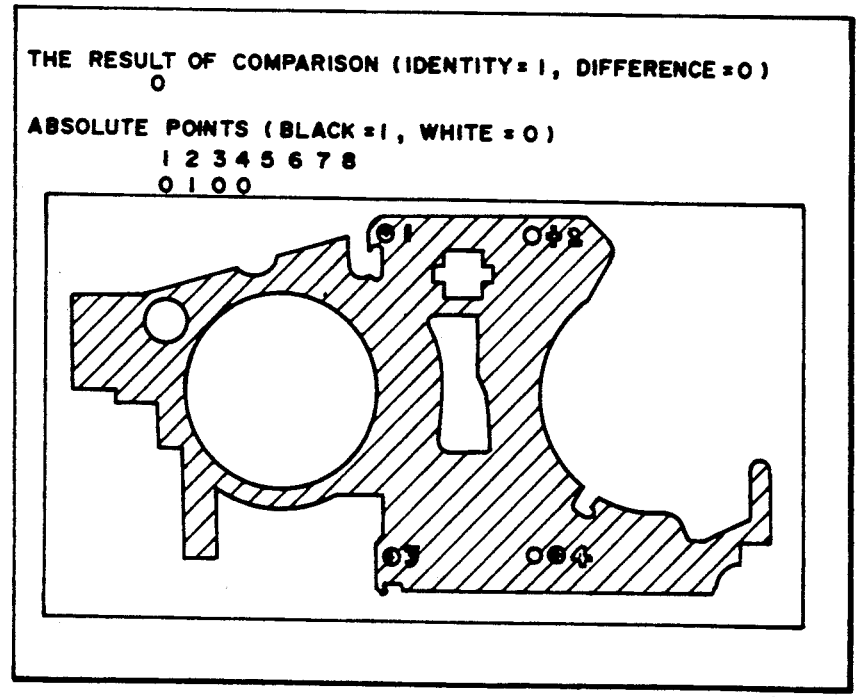

FIGS. 11 and 12 illustrate judgment where perforations are required to be formed in printed circuit boards, and up to four judging points "1" to "4" are respectively set for four perforations of a candidate printed circuit board.

In the case of the printed circuit board shown in FIG. 11, the four perforations are formed regularly therein, and consequently the value "1" represent of a regular condition is displayed as judgment results. Thus, the value "0" represent judging point is white (because a perforation is detected) is displayed for each of the judging point numbers "1" to "4".

On the contrary, in the case of the printed circuit board shown in FIG. 12, no second perforation is formed therein. Accordingly, the value "0" representing an "error" as the result of comparison is displayed on the second line of the display, and the value "1" indicating that the judging point is black (no perforation) is displayed on the fifth line of the display corresponding to the judging point number "2" on the fourth line of the display.

A method of discriminating between black and white at a particular judging point is described below.

A picture image picked up by the video camera is resolved into 512 picture elements × 512 picture elements as shown in FIG. 5A and is digitized in a binary fashion to a white level or a black level for each of the picture elements. Then, as shown by a thick line block in FIG. 5A, the 3 picture elements × 3 picture elements centered at a picture element indicated by a cursor are regarded as a judging point for which a judgment between black and white is to be made. The 3 picture elements × 3 picture elements are weighted as illustrated for example in FIG. 5B. The distribution of such weights may be set by an operator and the sum total of such weights is 100.

Let it be assumed that the 3 picture elements × 3 picture elements present a white and black distribution as shown for example in FIG. 5C. Then, if a white picture element is represented as "0" and a black picture element is represented as "1", FIG. 5C can be represented as shown in FIG. 5D. Thus, the evaluation value Ev for the judging point (the area of the 3 picture elements × 3 picture elements) indicated by the cursor may be calculated as follows:

$$\begin{aligned} EV &= 5 \times 0 + 10 \times 0 + 5 \times 0 + \\ &\quad 10 \times 0 + 40 \times 1 + 10 \times 1 + \\ &\quad 5 \times 1 + 10 \times 1 + 5 \times 1 \\ &= 70 \end{aligned}$$

The calculated value Ev is then compared with a threshold level $E_{TH}$ which has been arbitrarily set by an operator, and in accordance with results of the comparison, the judging point indicated by the cursor is judged as white or black.

Since Ev=70 in the case of the judgment described just above, where the setting of the evaluation value $E_{TH}$ is $E_{TH}=60$, the judging point indicated by the cursor is judged as "black" because $$EV > E_{TH}$$

On the contrary, where the setting of the evaluation value $E_{TH}$ is $E_{TH}=80$, the judging point indicated by the cursor is judged as "white" because $$EV < E_{TH}$$

With the embodiment described above, discrimination between regular and irregular conditions is made for an arrangement of parts or a part making a reference with respect to a master provided by an arrangement of parts making a reference or by a part making a reference, and such discrimination is made for points set by an operator. Accordingly, the image recognition system can readily cope with parts arranged in any condition or with a part of any configuration.

Further, since a judging point can be arbitrarily set while an operator watches the screen of the monitor image receiver 42, the flexibility of the system is high. Besides, since a reference for judgment between white and black can be set arbitrarily, judgment can be made with a high reliability depending upon the circumstances.

Since a judging point has some extent, for example, of 3 picture elements×3 picture elements and each of such judging points is weighted to obtain an evaluation value Ev which is then compared with a threshold level $E_{TH}$ to obtain data of black and white for the judging point, the reliability of master data and candidate data remains high notwithstanding a change in illumination.

In addition, there is no necessity of a special circuit and no theoretical limitation in the number of judging points. Further, the system can be utilized also for simple template matching.

Master data and candidate data may be converted in advance with the aid of software into a run length code. Further, the threshold level of the binary digitizing circuit 31 may otherwise be set arbitrarily by an operator.

Master data may be saved on the floppy disk 29 in preparation for making the next judgment, or candidate data may be saved on the floppy disk 29 and used later as data which are to be statistically processed in a search for problems in the arrangement or production of parts. Furthermore, a cursor key on the keyboard 22 or a mouse may be used in place of the joystick 23.

Figure 13:
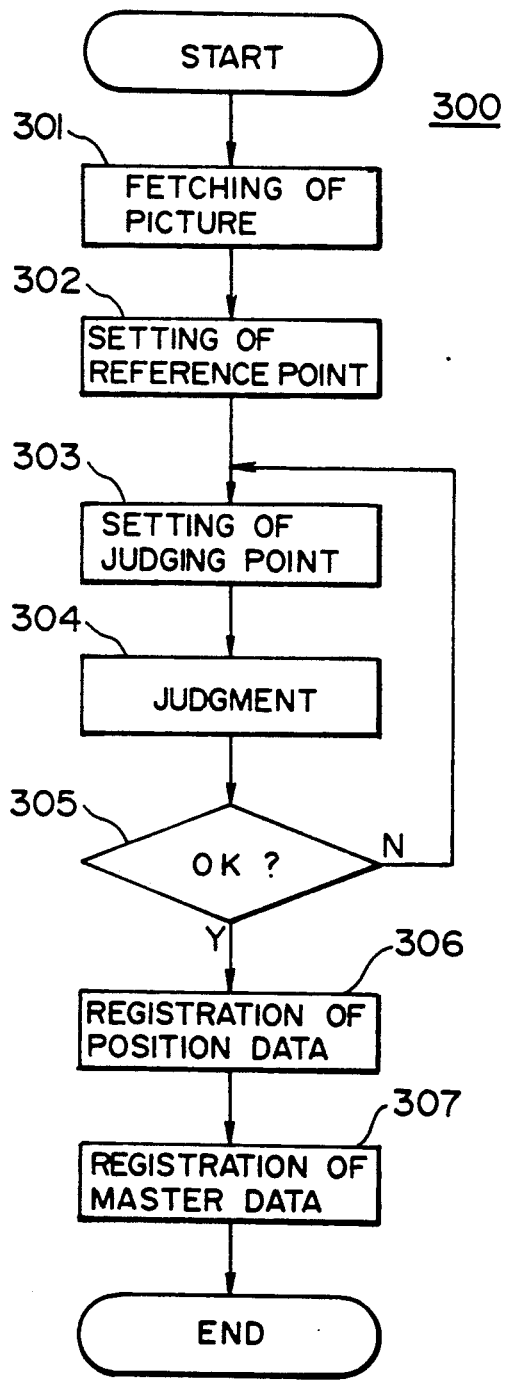
FIGS. 13 and 14 are flow charts showing operation of the image recognition system of FIG. 1 and in a second preferred embodiment of the present invention.
Figure 14:
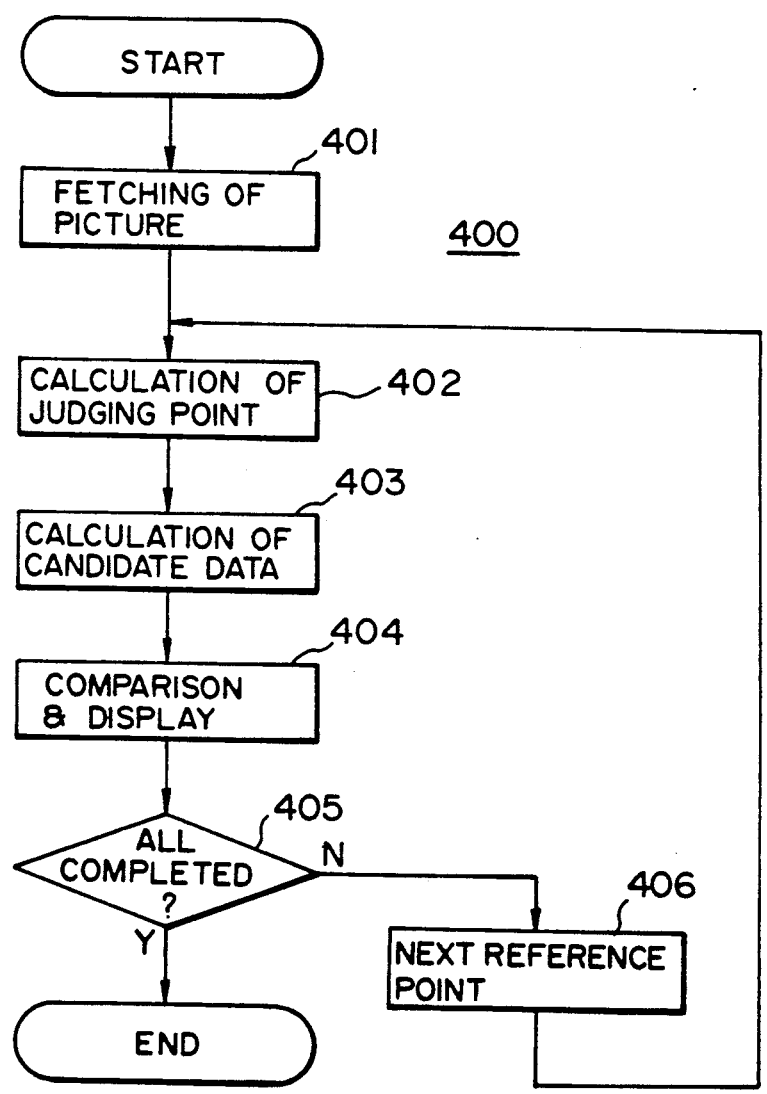

FIGS. 13 and 14 respectively illustrate programs 300 and 400 that are used in a second embodiment of the present invention. The second embodiment is applied to recognition of one of numerals from "0" to "9" displayed by selective actuation of different ones of seven display segments arranged in the form of numeral "8".

When the image recognition system of FIG. 1 is turned "on", the programs 300 and 400 saved on the floppy disk 29 are loaded into the RAM 13 (FIG. 2) as in the first embodiment described above, and then the system enters a command waiting condition.

When the operator enters a command via the keyboard 22 to enter the teaching mode, the program 300 is executed.

After starting of the program 300, at step 301, a picture image of a master pattern making a reference for pattern recognition is picked up by the camera 41, and thereupon signals Sb for one frame are written into the memory 32 by DMA transmission. The signals Sb thus written are then recalled from the memory 32 by the CRT controller 37 and supplied to the monitor image receiver 42 on which the master pattern making a reference is displayed as shown in FIG. 15.

Figure 15:
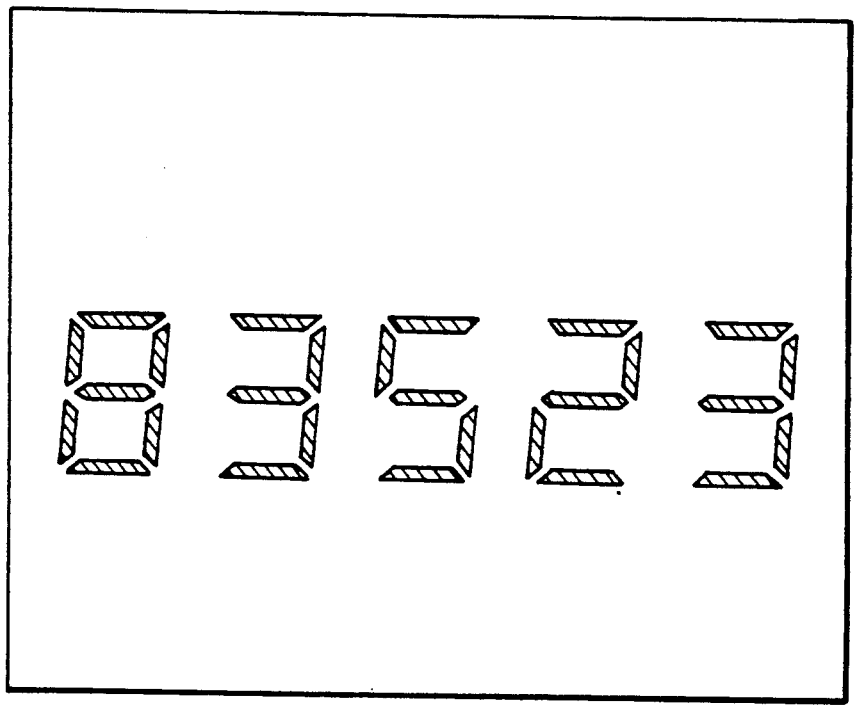
FIGS. 15 to 20 are schematic illustrations showing picture planes when numerals displayed by seven display segments are discriminated by the image recognition system of the second embodiment.

FIG. 15 indicates a master pattern wherein four kinds of five numerals including "2", "3", "5" and "8" are displayed in binary digitized black and white colors.

Figure 16:
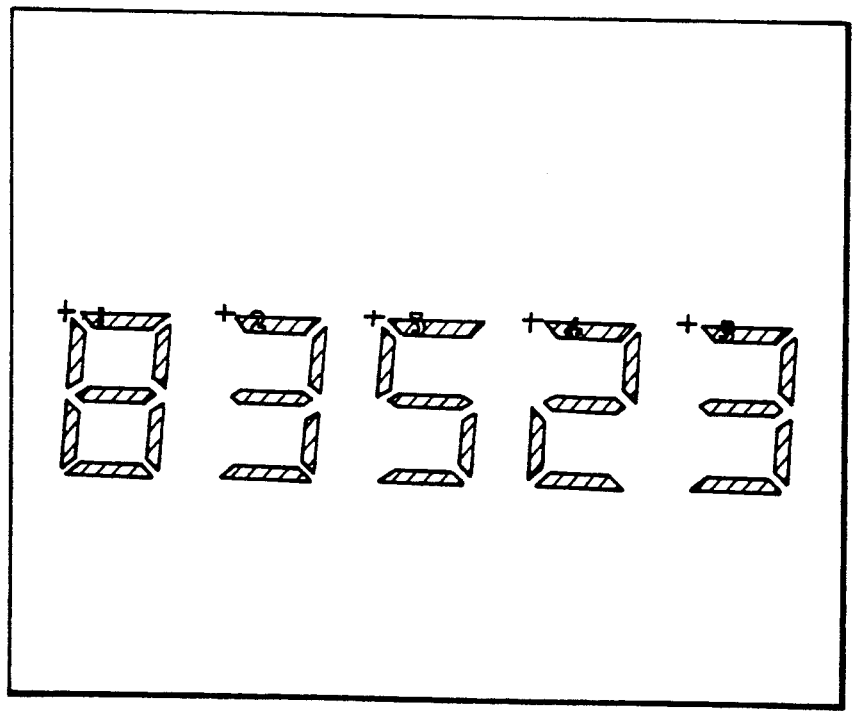

Subsequently, the program of the CPU 11 advances to step 302, at which setting of reference points on the absolute coordinate system is executed. In particular, signals of the cursor generator 36 and the character generator 35 are supplied to the monitor image receiver 42 so that cursors consisting of cross marks and numbers identifying different judging points are displayed on the picture plane of the monitor image receiver 42 as shown in FIG. 16. The positions of the cursors on the picture plane of the monitor image receiver 42 can be changed arbitrarily to set reference points by operation of the joystick 23.

FIG. 16 shows reference points and annexed reference point numbers "+1" to "+5" shoulder portions of the individual numeral display patterns.

Figure 17:
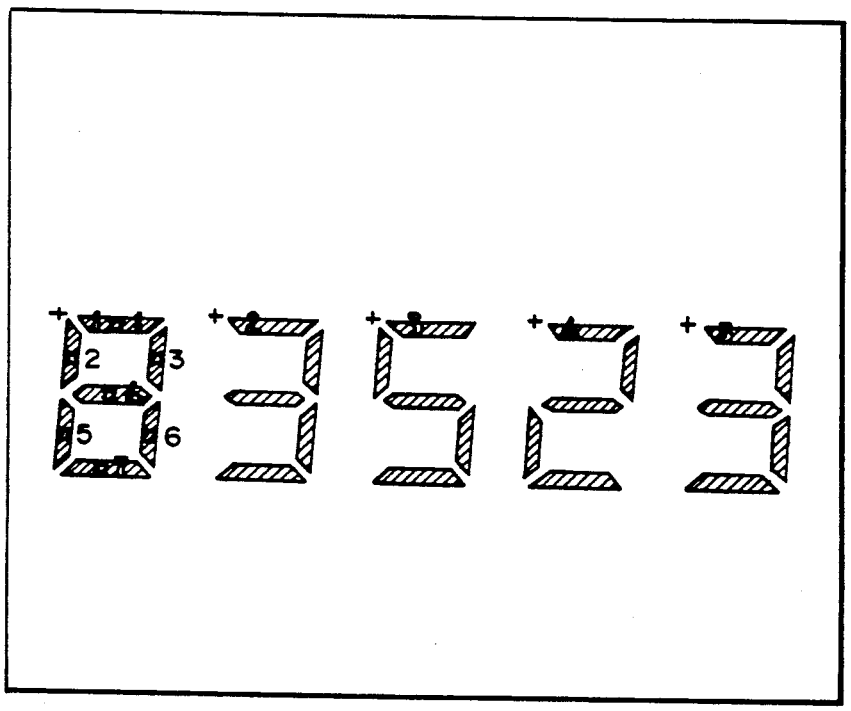

Subsequently, the program advances to step 303, at which setting of a judging point is executed. As at step 302 described above, cursors consisting of an x mark and corresponding numbers of individual judging points are displayed on the screen of the monitor image receiver 42 as shown in FIG. 17. The positions of the cursors on the picture plane of the monitor image receiver 42 can be changed arbitrarily by operation of the joystick 23.

Each of the judging points is designated on a relative coordinate system the origin of which coincides with the associated reference point and is set to a point significant to recognition of a pattern. Thus, FIG. 17 shows judging points "x1" to "x7" set to the first numeral display pattern wherein the origin of the relative coordinate system is located at the first reference point "+1".

Figure 18:
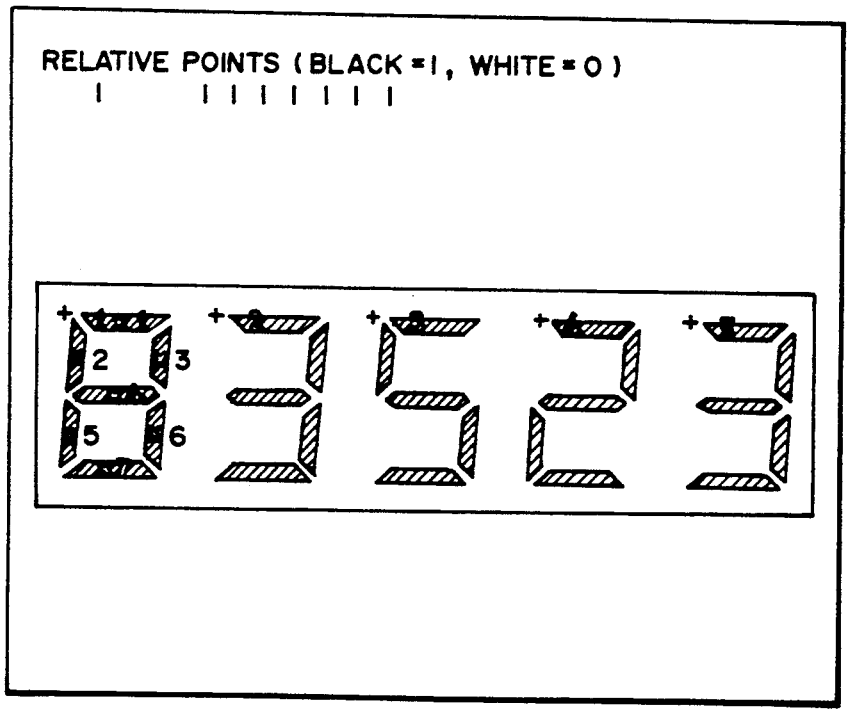

Subsequently, the program advances to step 304, at which white/black information is calculated and judged for each of the judging points set at step 303, and the results of such judgment are displayed as shown in FIG. 18.

In FIG. 18, the second line of the display picture image indicates the results of the judgment. In the second line, the first or leftmost numeral represents the numeral pattern number "1", and the second to eighth numerals indicate results of judgment for the judging points "x1" to "x7". The numeral "0" in the second to eighth numerals represents that the judging point is white, while the numeral "1" represents that the judging point is black.

Subsequently, the program advances to step 305, at which a sentence inquiring of the operator whether or not the results of the judgment at step 304 or the displayed contents are correct is displayed on the display unit 42. If the operator supplies an input by way of the keyboard 22 indicating that they are incorrect, the program returns to step 303 to repeat the sequence of operations including resetting of the judging points "x1" to "x7". On the contrary, when the operator supplies an input at step 305 indicating that the results of the judgment at step 304 are correct, the program advances to step 306.

At step 306, the absolute coordinates of the first reference point "+1" and the relative coordinates of the judging points "x1" to "x7" are registered as position data in the RAM 13. At step 307, the results of the judgment made at step 304 are registered as master data in the RAM 13, and at the same time it is registered that the numeral is "8", thereby completing the processing of the master pattern (numeral pattern) for the first reference point "+1".

Steps 304 to 307 are then repeated for the remaining reference points "+2" to "+5". In this instance, however, the relative positions of the judging points "+1" to "+7" for the reference points "+2" to "+5" are automatically set to be the same as those of the reference point "+1" and are not set by the operator. Thus, data of the relative coordinates of the judging points "x1" to "x7" with respect to the reference point "+1" are used also for the reference points "+2" to "+5" so that the judging points "x1" to "x7" are automatically set for the reference points "+2" to "+5". The relative coordinates of the judging points "x1" to "x7" with respect to the reference points "+2" to "+5" are not registered either.

Figure 19:
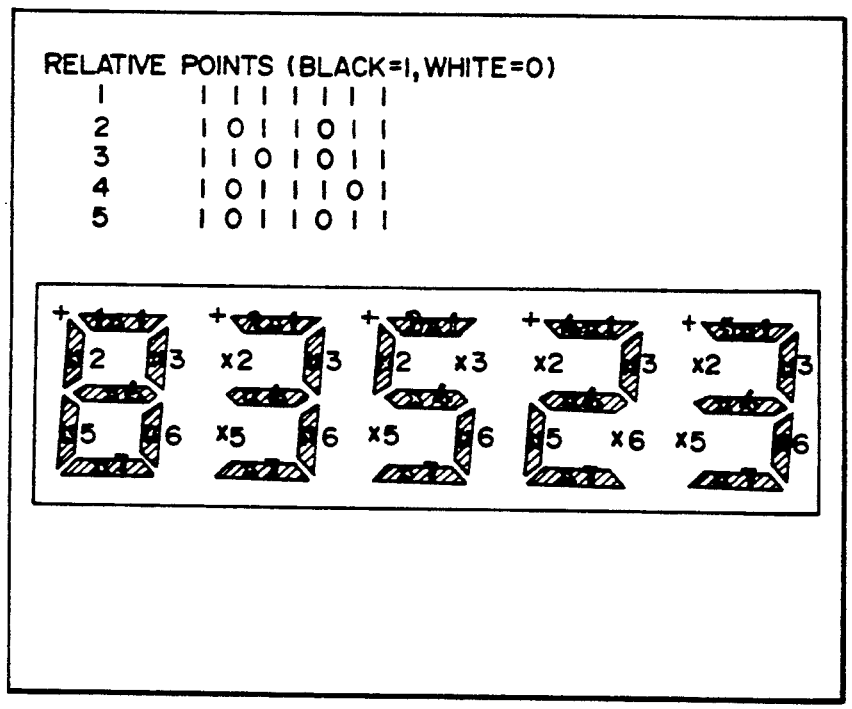

FIG. 19 illustrates a picture image wherein the results of judgment of the judging points "x1" to "x7" with respect to all of the reference points "+1" to "+5" are displayed. The numerals in the picture image of FIG. 19 have meanings similar to those of FIG. 18.

The teaching of the master pattern is thus completed, and the system enters a command waiting condition again.

Then, if the operator of the system by means of the keyboard 22 commands the system to enter the recognition executing mode, program 400 is executed (FIG. 14).

After starting of the program 400, bi-level signals Sb for one frame which represent a pattern of a candidate for pattern recognition are written, at step 401, into the memory 32 by DMA. The signals Sb thus written in are read out by the CRT controller 37 and supplied to the monitor image receiver 42, on which a pattern of the candidate article is displayed on the display picture plane as shown in FIG. 15.

Subsequently, the program of the CPU 11 advances to step 402, at which the position data indicative of the absolute coordinates of the first reference point "+1" and the relative coordinates of the judging points "x1" to "x7" are read out from the RAM 13 and the positions (absolute coordinates) of the judging points "x1" to "x7" are calculated from the position data thus read. Then at step 403, white/black information of the positions obtained at step 402, that is, candidate data, are calculated from the signals Sb of the memory 32.

Figure 20:
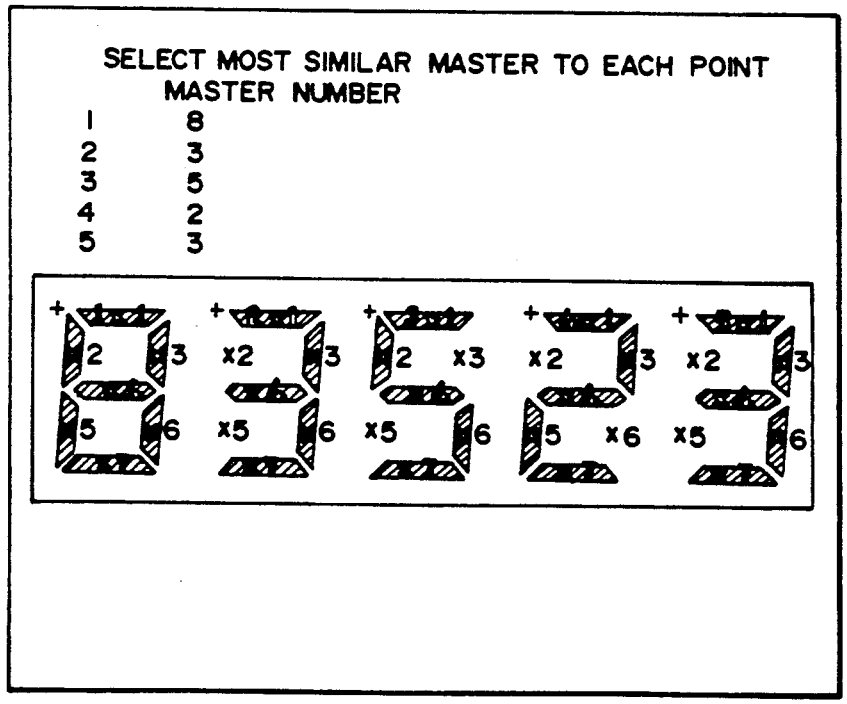

At step 404, the candidate data calculated at step 403 are compared with the master data registered in the RAM 13, and a numeral corresponding to the master data nearest to the candidate data is displayed as the results of recognition on the display picture plane as shown in FIG. 20.

In FIG. 20, on the lines beginning with the third line, the numbers of the candidate data (number of the reference points) are displayed on the left side while numerals "0" to "9" of the candidate patterns as recognized by the system are displayed on the right side. The reference points "+1" to "+5" and the judging points "x1" to "x7" then are also displayed on the display picture plane.

At step 405, a determination is made whether or not the results of recognition are displayed for all of the reference points, and in case the results of recognition are displayed for all of the reference points as shown in FIG. 20, the program 400 comes to an end; however, when results of recognition are not displayed for all of the reference points, the next reference point is selected at step 406, whereupon the program returns to step 402.

In the second embodiment, since it is only necessary to set judging points and a reference for judgment between white and black, the setting is very simple compared to a conventional pattern matching method. Besides, since judging points are set with respect to relative coordinate systems wherein the origin is located at a reference point on the absolute coordinate system, setting of judging points is simple for a plurality of master patterns and candidate patterns.

Further, since judging points and a reference for judgment between white and black can be set arbitrarily by an operator, the flexibility to deal with various types and numbers of patterns is high.

In addition, since it is necessary to discriminate only between white and black in dependence upon bi-level data, the processing time is short.

Figure 21:
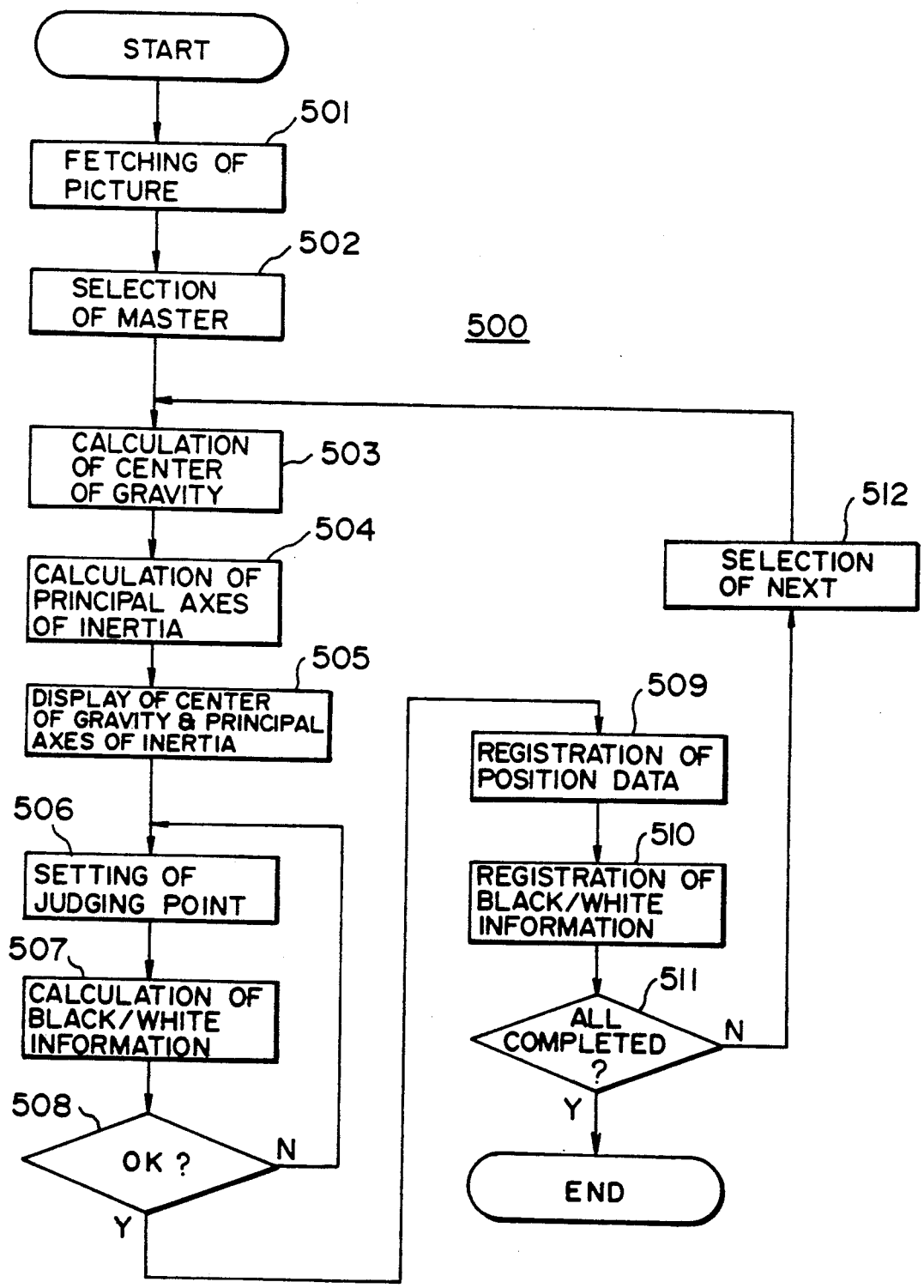
FIGS. 21 and 22 are flow charts showing operation of the image recognition system of FIG. 1 in a third preferred embodiment of the present invention.
Figure 22:
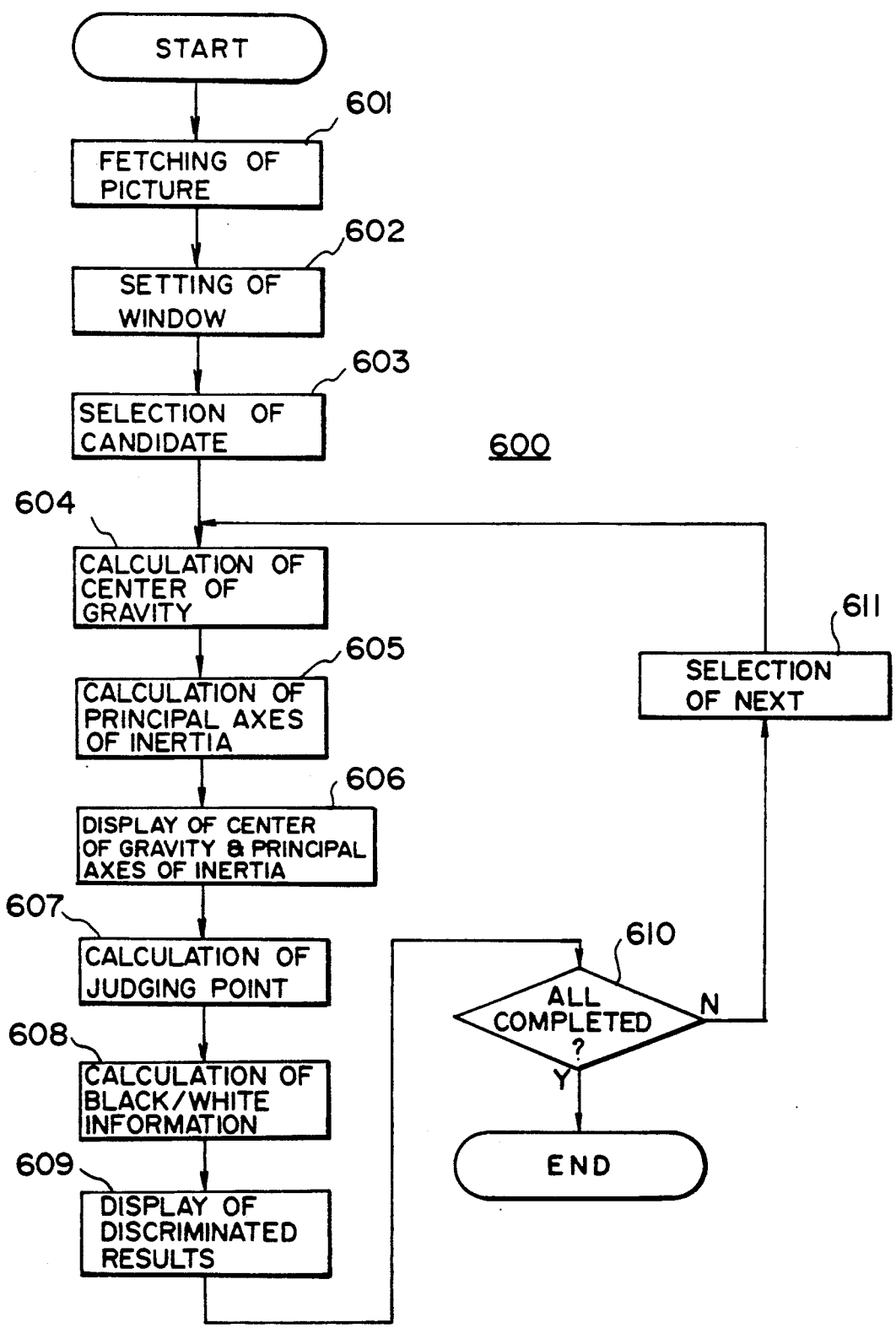

A third embodiment of the present invention will now be described. The third embodiment utilizes programs 500 and 600 illustrated in FIGS. 21 and 22, respectively.

This embodiment achieves flexible and accurate recognition by determining judging points depending upon a center of gravity and a principal axis of inertia and by recognizing a candidate article from white/black information at the judging points.

When the third embodiment of the image recognition system is turned on, the programs 500 and 600 saved on the floppy disk 29 are loaded into the RAM 13 (FIGS. 1 and 2), and then the system enters a command waiting condition, as in the embodiments described above.

If the operator of the system by means of the keyboard 22 commands the system to enter the teaching mode, the program 500 is executed.

After starting of the program 500, at first at step 501, a picture image of a master article constituting a reference for recognition is picked up by the camera 41. Thereupon, signals Sb for one frame are written into the memory 32 by DMA transmission. The signals Sb thus written are then read out by the CRT controller 37 and supplied to the monitor image receiver 42, on which a pattern representing the master article is displayed on the display screen as shown in FIG. 23.

Figure 23:
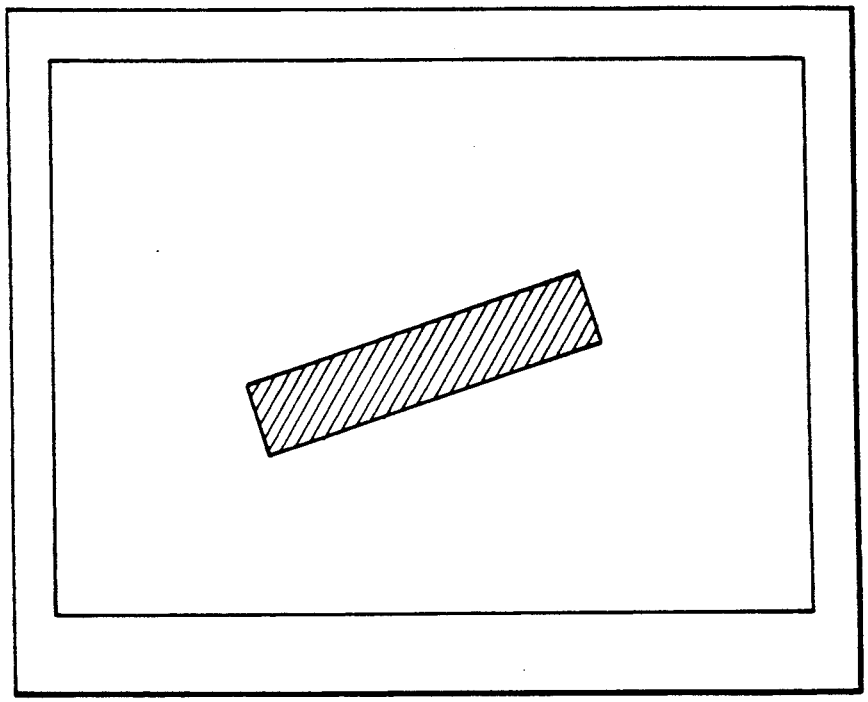
FIGS. 23 to 27 are schematic illustrations showing picture planes when a particular shape of an article is discriminated by the image recognition system of the third embodiment.

FIG. 23 indicates a black rectangular master pattern which is picked up from a rectangular article disposed in an arbitrary orientation as a master article and displayed on the display picture plane. The number of such master articles (master patterns) is arbitrary; in FIG. 23 there is one such article.

Subsequently, the program advances to step 502, in which, where there are a plurality of master patterns, one of the master patterns is selected.

Figure 24:
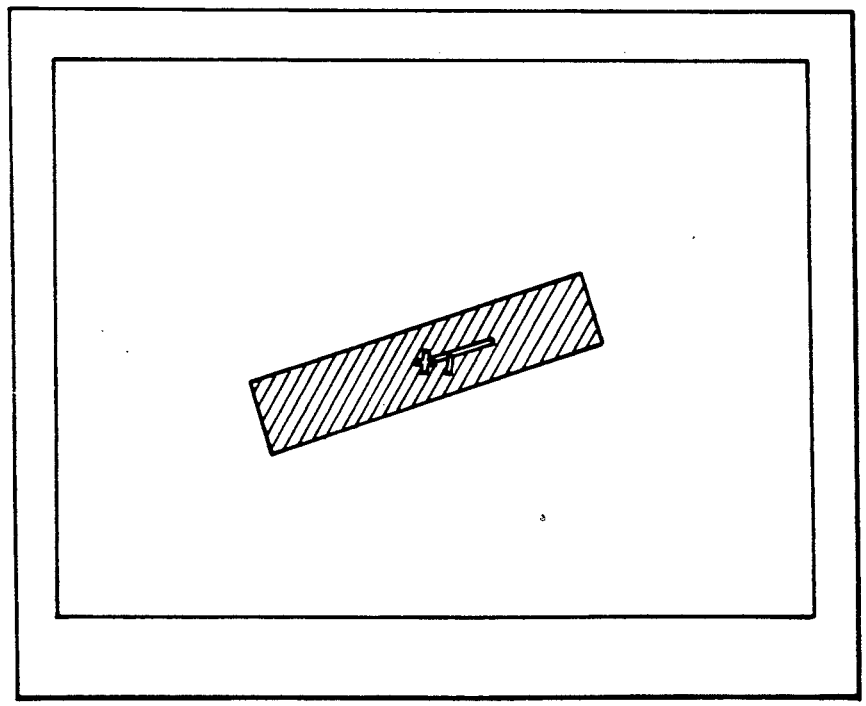
Figure 31:
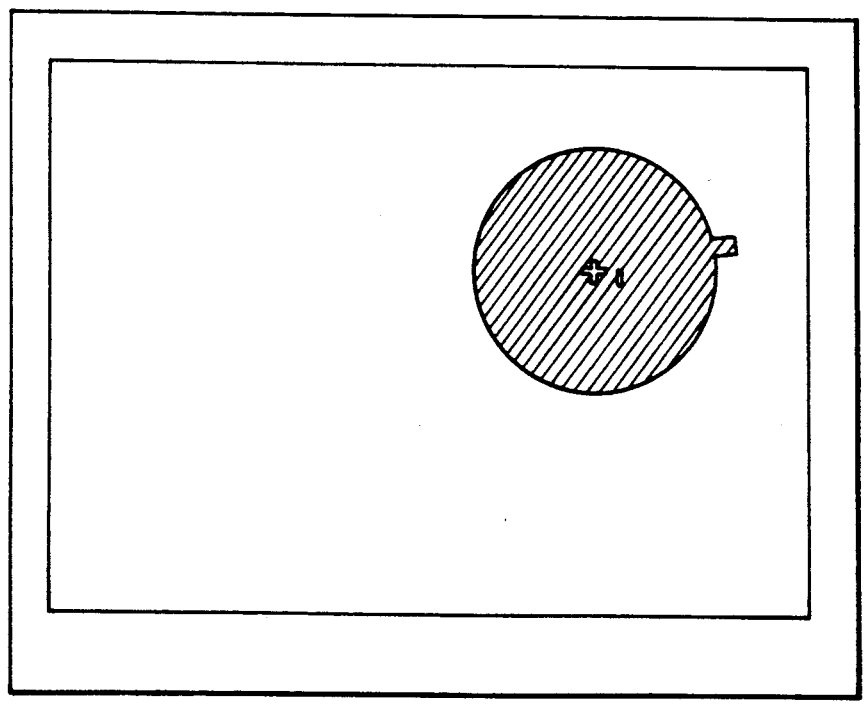

At step 503, the center of gravity of the master pattern selected at step 502 is calculated, and then at step 504, the principal axis of inertia (the axis about which the rotational inertia is minimized) of the master pattern is calculated by bisecting the angle formed by lines extending from the center of gravity to the farthest points of the pattern (for example, to the corners of the rectangles in FIG. 24 or to the outer corners of the protrusion in FIG. 31).

At step 505, signals of the character generator 35 and cursor generators 36 are supplied to the display device 42 by the CRT controller 37 so that, at the location on the display picture plane of the center of gravity as calculated at step 503, a gravity center mark such as "+" indicating the center of gravity and a master pattern number such as "1" are displayed in a manner such as "+1" as shown in FIG. 24, while at the same time the principal axis of inertia calculated at step 504 is displayed as a segment of a straight line extending from the gravity center mark "+" in the direction that has been calculated for that axis.

Figure 25:
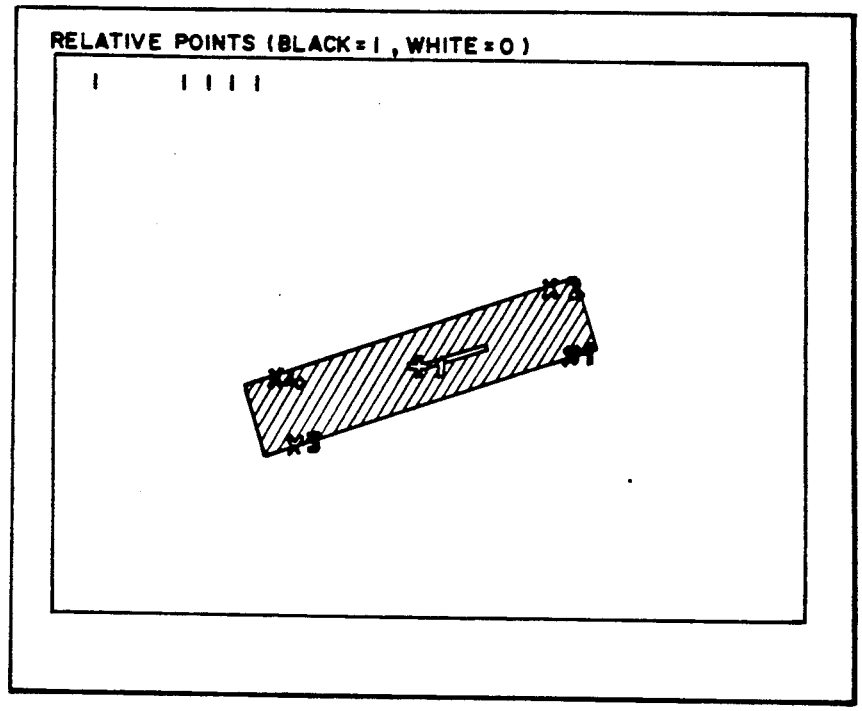

Then the program advances to step 506, at which the judging points are set. In particular, in response to signals from the generators 35 and 36, x-shaped cursors and judging point numbers are displayed on the display plane as shown in FIG. 25. The positions of the cursors and the judging point numbers displayed on the display picture plane can be changed arbitrarily in response to operation of the joystick 23, thereby setting the judging points.

Each of the judging points is designated on relative coordinate systems wherein the origin coincides with the associated reference point and the reference axis coincides with the direction of the principal axis of inertia, and is set to a point significant to recognition of a pattern. Thus, FIG. 25 shows judging points of "x1" to "x4" set with respect to the center of gravity "+1" to which the origin is set.

Subsequently, the program advances to step 507, at which white/black information is calculated and judged for each of the judging points "x1" to "x4" set at step 506, and the results of such judgment are displayed as shown in FIG. 25.

In FIG. 25, the second line of the displayed image indicates the results of the judgment. In the second line, the first or leftmost numeral represents the first master pattern, and the second to fifth numerals indicate results of judgement for the judging points "x1" to "x4", respectively. The numeral "0" if occurring in the second to fifth positions represents that the judging point is white while the numeral "1" represents that the judging point is black.

Subsequently, the program advances to step 508, at which a sentence is displayed on the display unit 42 inquiring of the operator whether or not the displayed results of the judgment at step 507 are correct. If the operator supplies as an input by way of the keyboard 22 as a response to the inquiry a signal indicating that they are incorrect, the program returns to step 506 to repeat the sequence of operations including resetting of the judging points "x1" to "x4". However, if the input supplied at step 508 indicates that the results of the judgment at step 507 are correct, the program advances to step 509.

At step 509, data of the relative coordinates of the judging points "x1" to "x4" for the first master pattern, that is, data regarding the distance from the center of gravity and the angle with respect to the principal axis of inertia are registered as position data in the RAM 13. Then at step 510, the results of the calculation (white/black information) at step 507 are registered as master data in the RAM 13 while at the same time it is registered that the data relate to the first master article, thereby completing the processing of the first master article.

At step 511, it is determined whether or not there remains on the display picture plane a master pattern which has not yet been registered. When there is a master pattern not yet registered, the program advances to step 512, at which a subsequent master pattern is selected and then returns to step 503 in order subsequently to execute steps 503 to 510 again for the newly selected master pattern. Then, when it is judged at step 511 that all of the master patterns displayed on the display picture plane have been registered, the program 500 comes to an end.

When the judging points "x1" to "x4" for the second or any subsequent master pattern are set at step 506, the data of the relative coordinates of the corresponding judging points "x1" to "x4" for the first master used automatically; the operator need not set them again.

Figure 26:
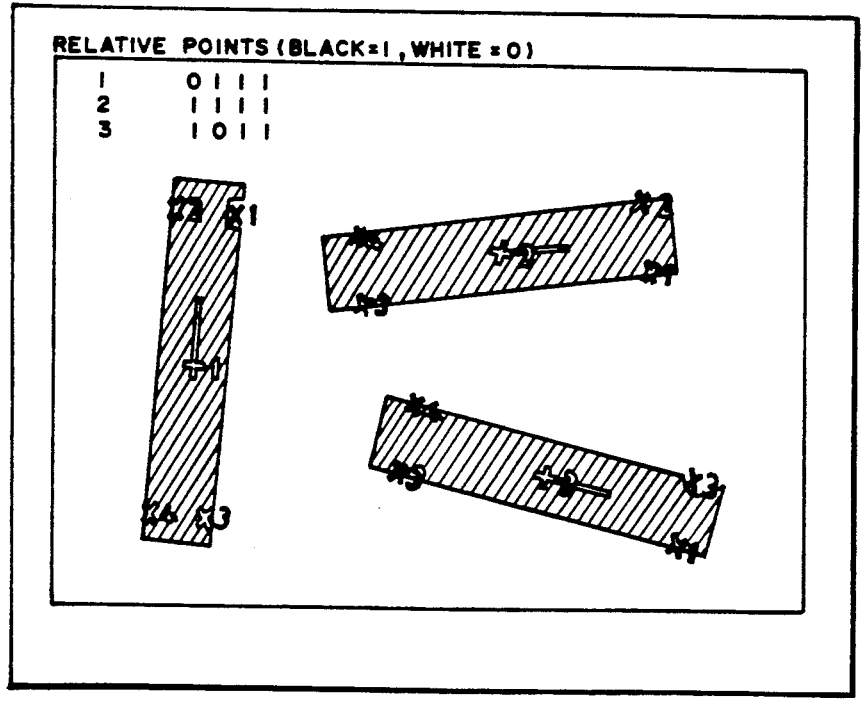

FIG. 26 shows three master patterns as displayed on the display picture plane when they are all registered, and also shows marks and symbols similar to those of FIG. 25.

In case a plurality of master patterns cannot be displayed simultaneously within a single display picture plane, the program 500 may be executed again for such surplus master article or articles.

The teaching of the master pattern or patterns is thus completed, and the system enters a command waiting condition again.

If by means of the keyboard 22 the operator commands the system to enter a recognition executing mode, the program 600 (FIG. 22) is executed.

After starting of the program 600, bi-level signals Sb for one frame of an article which is a candidate for recognition are written, at step 601, into the memory 32 by DMA transmission. The signals Sb thus written in are read out by the CRT controller 37 and supplied to the monitor image receiver 42, on which a pattern of the candidate is displayed on the display picture plane as shown in FIG. 23.

Subsequently, the program of the CPU 11 advances to step 602, at which a window is displayed on the display picture plane in response to signals from the cursor generator 36. The position of the displayed window is arbitrarily changed in response to operation of the joystick 23, and a display area for a pattern which is a candidate for recognition is thus established within the display picture plane. An arbitrary number of candidate patterns may be displayed within the window.

Then at step 603, one of the candidate patterns within the window set at step 602 is selected, and then at step 604, the center of gravity of the candidate pattern selected at step 603 is calculated, whereafter the principal axis of inertia of the candidate pattern is calculated at step 605.

At step 606, in response to signals from the generators 35 and 36, a gravity center mark and a candidate pattern number are displayed at the center of gravity as calculated as step 604 in a manner similar to that illustrated in FIG. 25 or 26. At the same time, the principal axis of inertia calculated at step 605 is displayed as a segment of a straight line extending in the direction of the principal axis of inertia from the gravity center mark.

At step 607, data of the relative coordinates are read out from the RAM 13. On the basis of these relative coordinates and of the center of gravity and the principal axis of inertia as calculated at steps 604 and 605, the absolute coordinates of the judging points "x1" to "x4" are derived. At step 608, white/black information constituting candidate data of the judging points "x1" at step 607 are calculated from the signals Sb of the memory 32.

Figure 27:
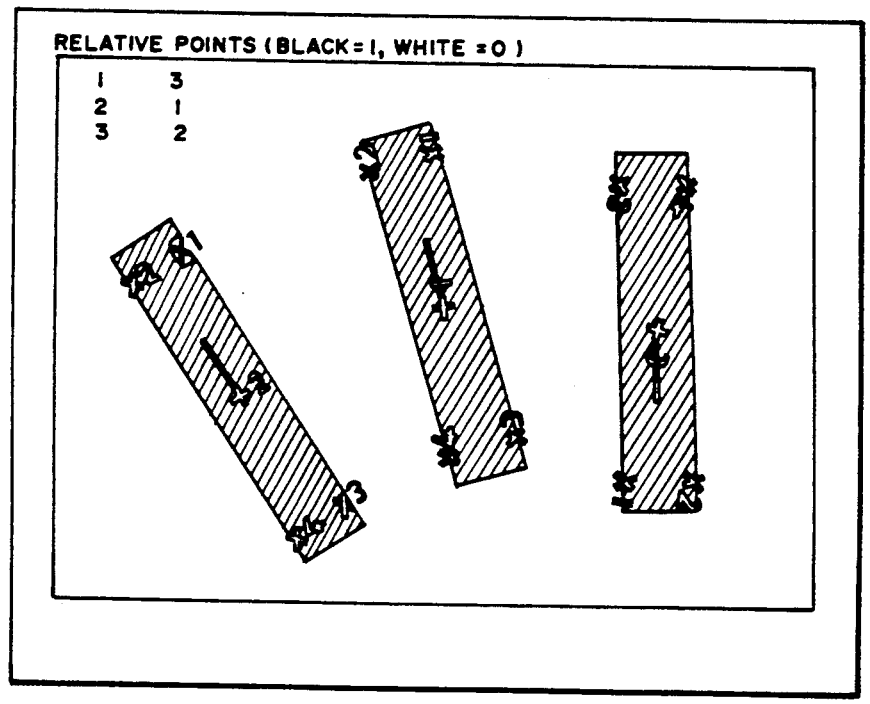

At step 609, the candidate data calculated at step 608 are compared with the master data registered in the RAM 13, and a numeral corresponding to the master pattern corresponding to the master data nearest to the candidate data is displayed as the results of recognition on the display picture as shown in FIG. 27.

In FIG. 27, in the lines beginning with the second line, the numbers of the candidate patterns are displayed on the left side while the numbers of the recognized master patterns are displayed on the right side. The gravity center marks "+1" to "+3", the principal axes of inertia and the judging points "x1" to "x4" are also displayed on the display picture plane.

At step 610, a determination is made whether or not the recognition algorithm has been performed for all of the candidate patterns, and in case the recognition algorithm has been performed for all of the candidate patterns as shown in FIG. 27, the program 600 comes to an end. However, if the recognition algorithm has not been performed for all of the candidate patterns, the next candidate pattern is selected at step 611, whereafter the program returns to step 604.

In this manner, in the present embodiment, a pattern is judged with reference to its center of gravity and principal axis of inertia. Accordingly, a part can be recognized regardless of its position and orientation. Further, since the judging points can be set freely, judgment need be made only for portions required for recognition; accordingly, precise discriminations can be made at a high speed.

Further, since recognition is based on a calculation of the center of gravity and the principal axis of a part, a plurality of parts can be recognized at a time.

If judging points are set in a symmetrical relationship with respect to the principal axis of inertia or with respect to a line normal to the principal axis of inertia and passing through the center of gravity, discrimination between front and reverse sides of a part can be made.

Figure 28:
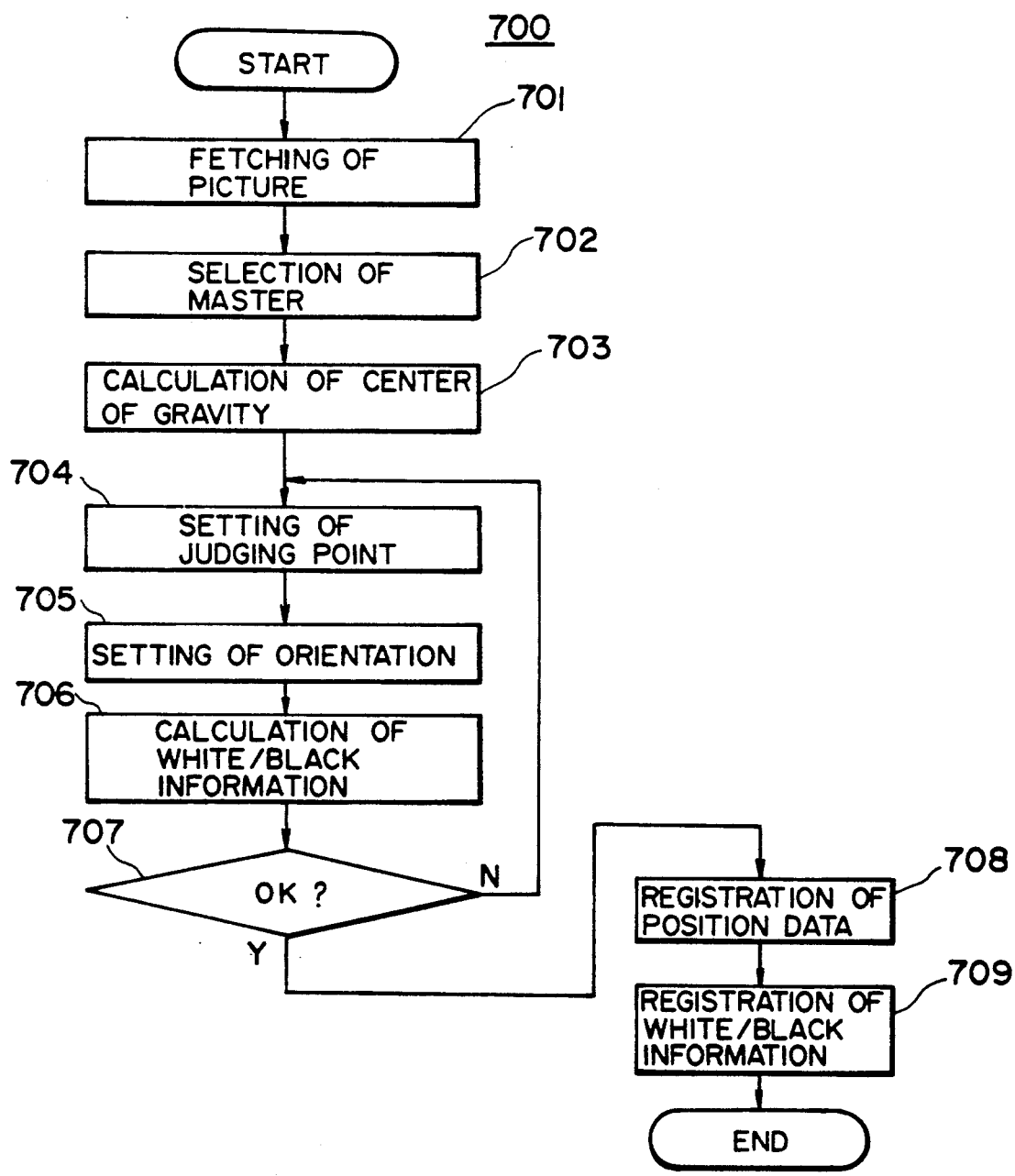
FIGS. 28 and 29 are flow charts showing operating of the image recognition system of FIG. 1 in a fourth preferred embodiment of the present invention.
Figure 29:
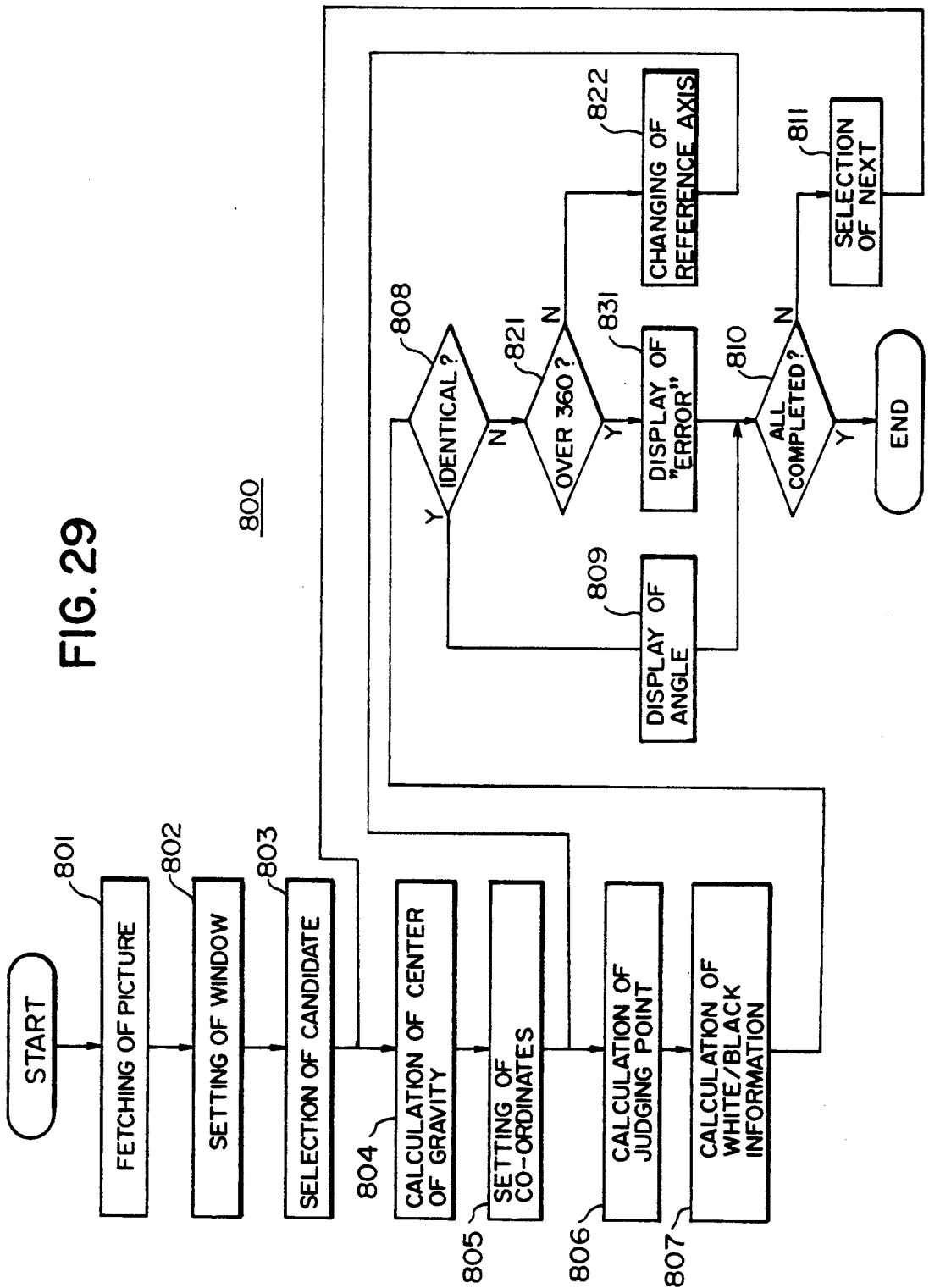

A fourth embodiment of the present invention is executed in accordance programs 700 and 800 illustrated in FIGS. 28 and 29, respectively.

This embodiment enables recognition of the directionality of a candidate article having a symmetric property by using, for example, the center of gravity of the candidate article as a reference point and using a singular point as viewed from the reference point as a judging point.

When the system is turned "on", the programs 700 and 800 saved on the floppy disk 29 are loaded into the RAM 13 (FIGS. 1 and 2), and then the system enters a command waiting condition.

If the operator by means of the keyboard 22 instructs the system to enter a teaching mode, the program 700 is executed.

Then, after starting of the program 700, at at step 701, a picture image of master article constituting a reference for recognition is picked up by the camera 41, and thereupon signals Sb for one frame are written into the memory 32 by DMA. The signals Sb thus written in are then read out by the CRT controller 37 and supplied to the monitor image receiver 42, on which the master pattern serving as a reference is displayed on the display picture plane as shown in FIG. 30.

Figure 30:
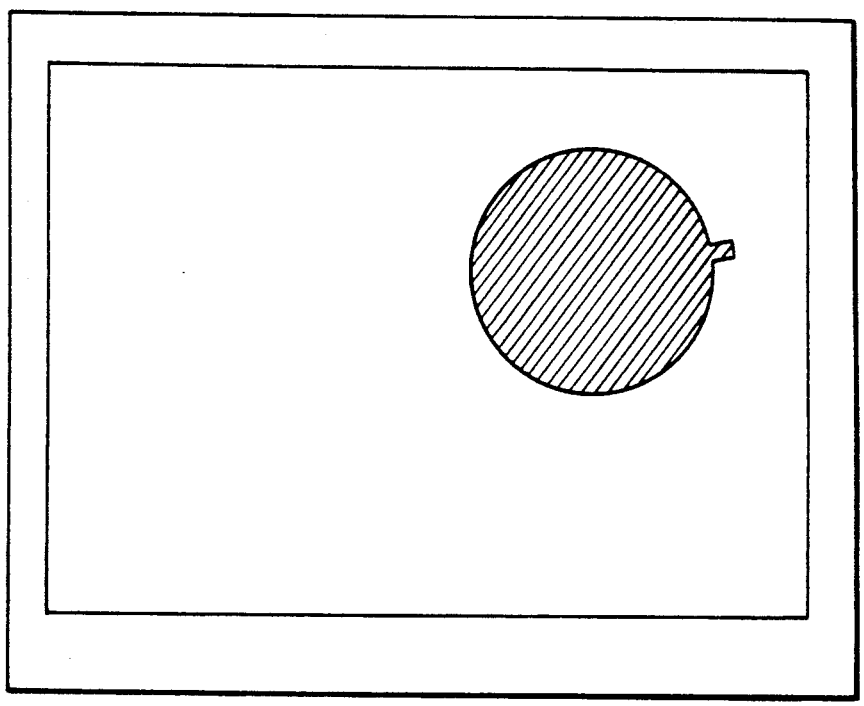
FIGS. 30 to 35 are schematic illustrations showing picture images when the orientation of an article is detected by the image recognition system of the fourth embodiment.

FIG. 30 indicates a black master pattern which is picked up from a circular part having a projection at a portion thereof and disposed in an arbitrary orientation as a master part and is displayed in a similar shape on the display picture plane. The number of such master parts (master patterns) is of course arbitrary and is one in FIG. 30.

Subsequently, the process advances to step 702. At this step, if there are a plurality of master patterns, one of the master patterns is selected in accordance with an instruction of the operator.

At step 703, the center of gravity of the master pattern selected at step 702 is calculated, and signals from the generators 35 and 36 are supplied to the monitor image receiver 42 so that a gravity center mark such as "+" indicating the position of the center of gravity calculated at step 703 and a master pattern number such as "1" are displayed in a manner such as "+1" at on the display picture plane of the center of gravity as shown in FIG. 31.

Figure 32:
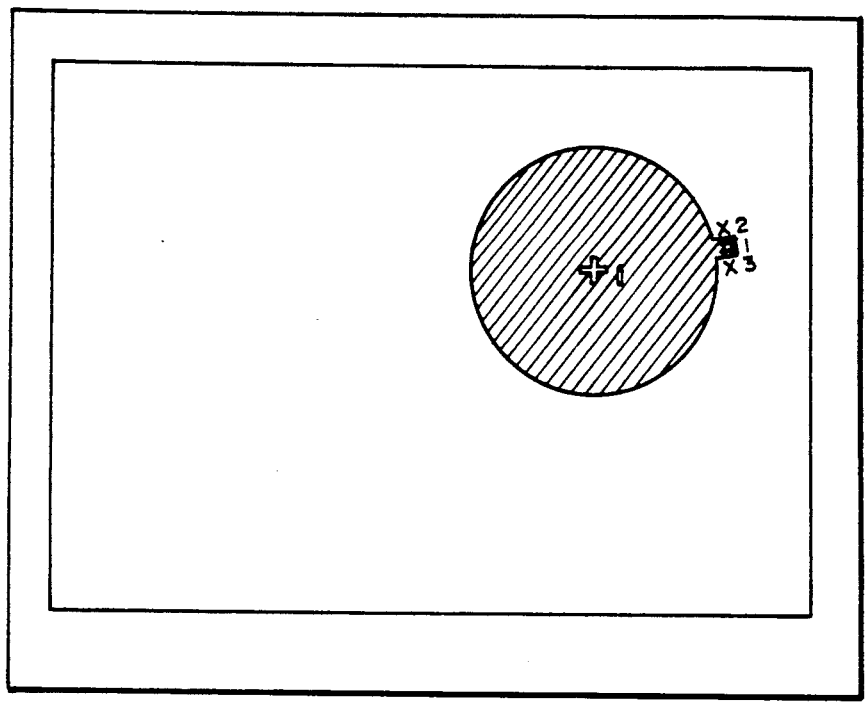
Figure 33:
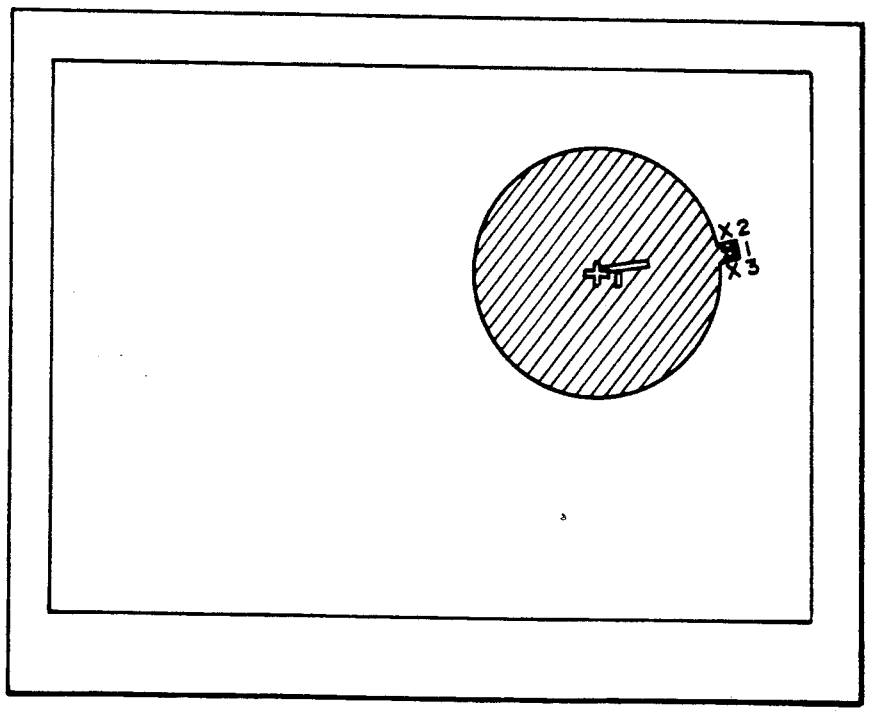

Then the program advances to step 704, at which judging points are set. In particular, in response to signals from the generators 35 and 36, x-shaped cursors and judging point numbers are displayed on the display picture plane as shown in FIG. 32. The positions of the cursors and the judging point numbers displayed on the display picture plane can be changed arbitrarily by operation of the joystick 23, thereby setting the judging points.

In this instance, each of the judging points is set to a point significant to recognition of the directionality with respect to a reference point provided by the center of gravity. To this end, in the case of FIG. 32, up to three judging points "x1" to "x3" are set so that the first judging point "x1" is at the projection of the master pattern while the second and third judging points "x2" and "x3" are at locations on the front and back sides of the judging point "x1" in a circumferential direction of the master pattern.

At step 705, a straight line interconnecting the center of gravity "+1" and the first judging point "x1" set at step 704 is set as a directive line (reference line) indicating the orientation of the master pattern (master part), and the directive line is displayed on the display picture plane. 704, the judging point Actually, however, at step 704, the judging point "x1" is set so that the straight line interconnecting the center of gravity "+1" and the judging point "x1" makes a directive line indicating the orientation of the master pattern.

Figure 34:
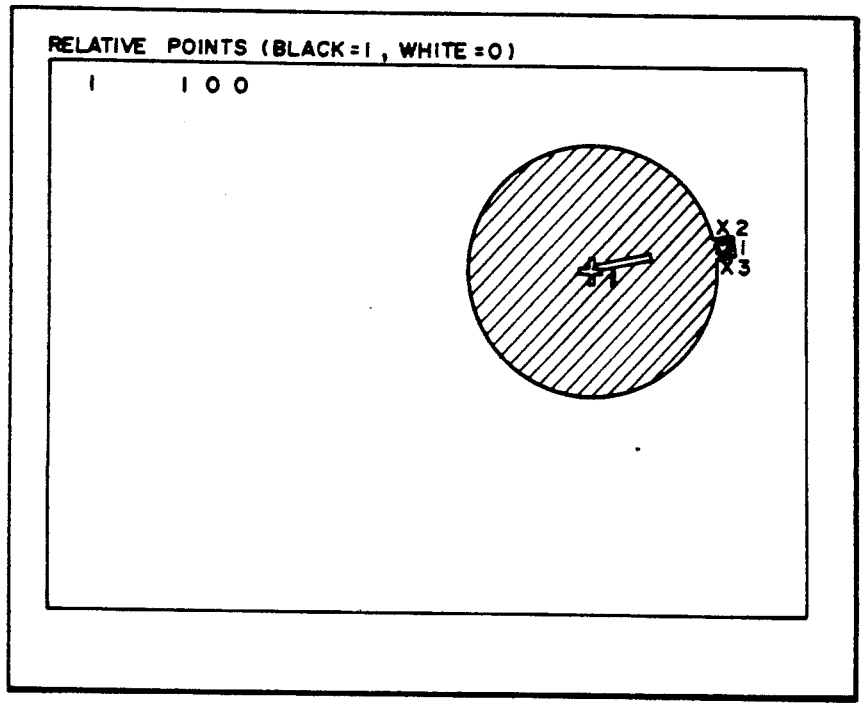

Subsequently, the program advances to step 706, at which white/black information of the judging points "x1" to "x3" set at step 704 is calculated and judged, and the results of such judgment are displayed as shown in FIG. 34.

In FIG. 34, the second line of the display picture image indicates the results of the judgment. In the second line, the first or leftmost numeral represents the master pattern number, and the second to fourth numerals indicate the results of the judgment for the points "x1" to "x3" The numeral "0" in the second to fourth numeral positions indicates that the judging point is white while the numeral "1" indicates that the judging point is black.

Subsequently, the program advances to step 707, at which a sentence inquiring of the operator whether or not the results of the judgement at step 706 or the displayed contents are correct is displayed on the display unit 42. If in response to the inquiry the operator supplies an input by way of the keyboard 22 indicating that the results are incorrect, the program returns to step 704 to repeat the sequence of operations including resetting of the judging points "x1" to "x3". On the contrary, if the input supplied at step 707 indicates that the results of the judgment at step 706 are correct, the program advances to step 708.

At step 708, data of relative polar coordinates of the judging points "x1" to "x3" with respect to the reference point provided by the center of gravity of the master pattern, that is, polar coordinates with respect to the origin coincident with the center of gravity and the reference axis constituted by a horizontal axis passing through the origin and extending to the right are set, and data of distances and angles of the judging points "x1" to "x3" in polar coordinates are registered as position data in the RAM 13. A step 709, the results of the judgment (white/black information) made at step 706 are registered as master data in the RAM 13, and then the program 700 comes to an end.

The teaching of the master pattern or patterns is thus completed, and the system enters a command waiting condition again.

If the operator by means of the keyboard 22 instructs the system to enter a recognition mode, the program 800 is executed.

After starting the program 800, bi-level signals Sb constituting one frame of an image of a part that is a candidate for recognition are written, at step 801, into the memory 32 by DMA transmission. The signals Sb thus written in are read out by the CRT controller 37 and supplied to the monitor image receiver 42 on which a pattern of the candidate article is displayed on the display picture plane as shown in FIG. 30.

Subsequently, the program of the CPU 11 advances to step 802, at which a window is displayed on the display picture plane in response to signals from the generator 36. The position of the window displayed is arbitrarily changed in response to operation of joystick 23, and an area for an object of recognition is thus set within the display picture plane. In this instance, an arbitrary number of candidate patterns may be displayed within the recognition area.

At step 803, one of the candidate patterns within the window set at step 802 is selected, and at step 804, the center of gravity of the candidate pattern selected at step 803 is calculated. At step 805, a relative coordinate system is established with respect to the reference point provided by the center of gravity of the candidate pattern selected at step 803. That is, a polar coordinate system is established with respect to the origin constituted by the center of gravity and the reference axis constituted by the horizontal axis passing through the origin.

Subsequently, at step 806, the position data registered in the RAM 13 at step 708 are read out from the RAM 13 and applied to the coordinate system established at step 805 in order to calculate absolute coordinates of the judging points "x1" to "x3". At step 807, white/black information, that is, candidate data of the judging points "x1" to "x3" calculated at step 806, are calculated from the signals Sb received from the memory 32.

At step 808, the candidate data calculated at step 807 are compared with the master data registered in the RAM 13, and in case the candidate data coincide with the master data, the program advances to step 809, at which the angle of the judging point "x1" when viewed from the center of gravity (angle with respect to the reference axis) is calculated. The angle thus calculated is displayed on the display picture plane as shown in FIG. 35 as the results of recognition of the orientation of the candidate part.

Figure 35:
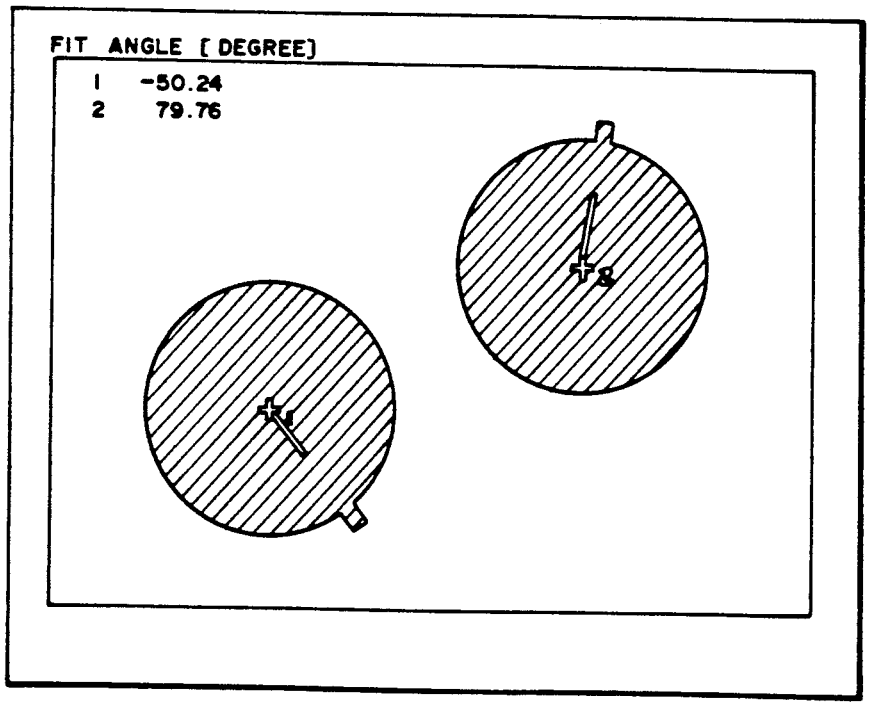

In FIG. 35, the numbers of the candidate patterns are displayed on the left side within a frame while the angles recognized are displayed on the right side. The gravity center marks "+1" and "+2" and the directional lines are also displayed on the display picture plane.

At step 810, a determination is made whether or not recognition has been made for all of the candidate patterns, and if recognition has been made for all of the candidate patterns as shown in FIG. 35, the program 800 comes to an end. If recognition has not been displayed for all of the candidate patterns, the next candidate pattern is selected at step 811, whereafter the program returns to step 804.

If the candidate data do not coincide with the master data at step 808, the program advances to step 821 at which a determination is made whether or not the reference axis of the polar coordinate system for the candidate pattern exceeds 360 degrees. If the reference axis does not exceed 360 degrees, the program advances to step 822. At step 822, the reference axis of the polar coordinate system for the candidate pattern is turned by a predetermined angle of $\alpha$ degrees (so that the judging points "x1" to "x3" are turned relatively by $-\alpha$ degrees), and then the program returns to step 806.

Accordingly, a loop of the steps 806 to 808, 821 and 822 is repeated, and each time the loop is repeated, the reference axis is turned by an angle of $\alpha$ degrees to change the positions of the judging points "x1" to "x3" by $-\alpha$ degrees around the candidate pattern.

When coincidence between the candidate data and the master data is reached, the angle of the judging point "x1" with respect to the reference axis, that is, the angle of the candidate part, is displayed on the display picture plane at step 809 as described above.

Whenever the angle of the reference axis exceeds 360 degrees at step 821, it is displayed on the display unit 42 at step 831 that coincidence between the candidate data and the master data cannot be reached, and then the process advances to step 810.

In this manner, the orientation of a candidate part is recognized or discriminated.

Figure 36:
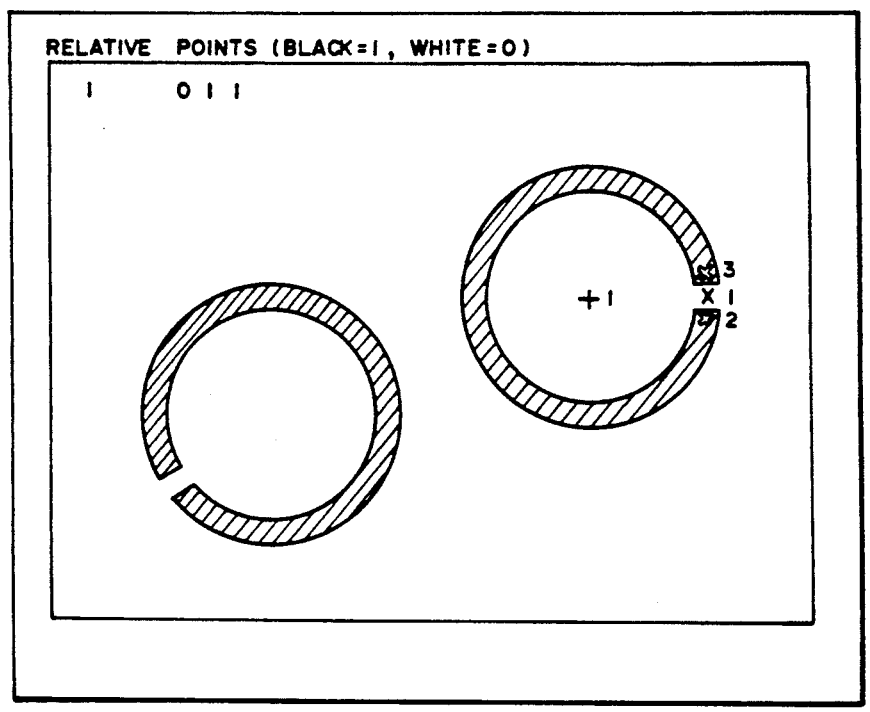
FIGS. 36 and 37 are schematic illustrations showing picture images when the orientation of a different article is detected by the image recognition system of the fourth embodiment.
Figure 37:
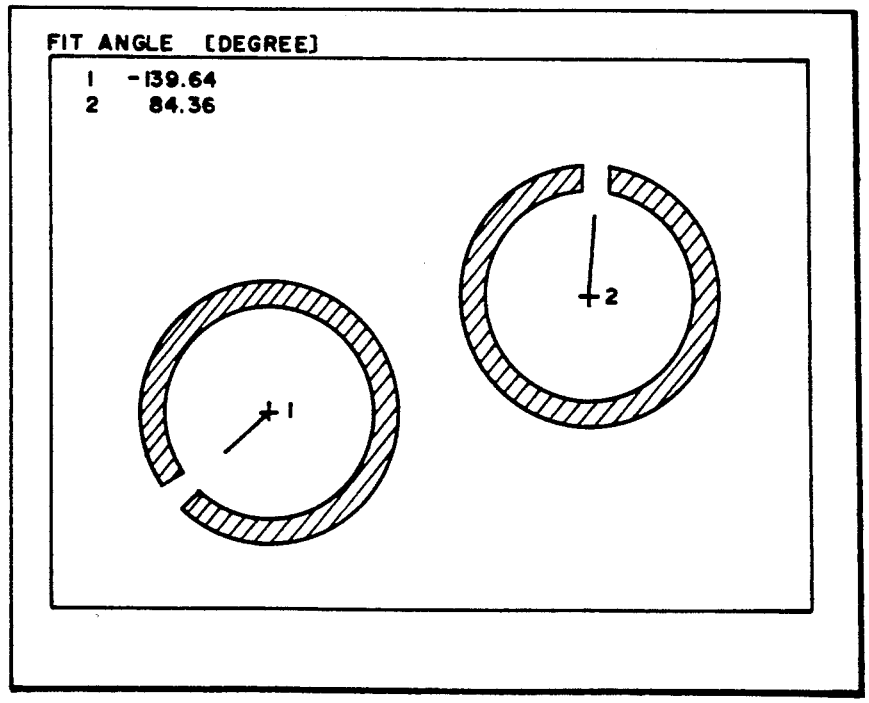

FIGS. 36 and 37 show another part and correspond to FIGS. 34 and 35, respectively. In FIG. 36, a master pattern is shown when judging points "x1" to "x3" are set for a C-shaped ring; in FIG. 37, the orientation of a candidate pattern is recognized.

Figure 38:
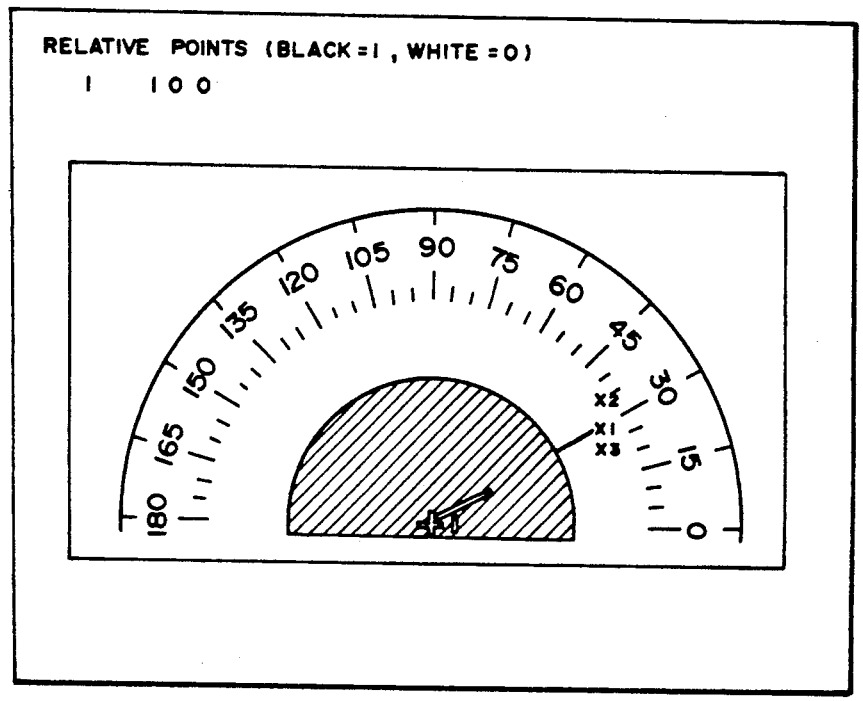
FIGS. 38 and 39 are schematic illustrations showing picture images when the angular position of an indicator needle of a measuring instrument is detected by the image recognition system of the fourth embodiment.
Figure 39:
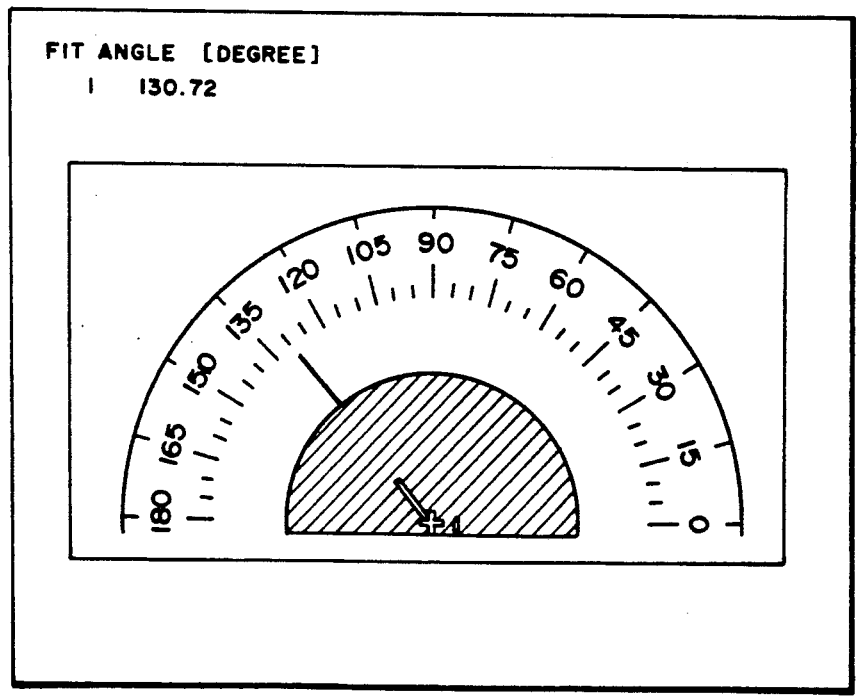

FIGS. 38 and 39 illustrate the reading of an indicator needle of a measuring instrument. As shown in FIG. 38, in the teaching mode, a judging point "x1" is set to the indicator needle, and judging points "x2" and "x3" are set at locations forward and rearward of the judging point "x1". In the recognition mode, the angle of the indicator needle is as shown in FIG. 39. In this instance, however, the origin of the polar coordinate system is not located at the center of gravity of the part but is set to the pivot point or center of turning motion of the indicator needle at steps 703 and 804 described above.

In this manner, in the present embodiment, the orientation of a part which has a generally symmetrical shape with respect to a point can be determined. Since the relative coordinate system is turned around a point coincident with the center of gravity, the orientation, which cannot be calculated by the inertial principal axis calculating method depending upon approximation to an ellipse, can be calculated with precision. Further, since the relative coordinate system is turned through an angle of 360 degrees, the orientation within 360 degrees can be discriminated, and the forward or reverse directionality can also be discriminated.

Further, if the origin is set to any point other than the center of gravity, an effect can be exhibited over a wide range where a singular point of a candidate article is not on a radial line passing through the center of gravity or where the center of gravity varies, and also in the case of, for example, a circular coordinate system such as the measuring instrument described above, it can be discriminated simply.

It will be apparent to one of ordinary skill in the art that many modifications of the preferred embodiments of the invention can be made without departing from the spirit and scope of the invention as set forth herein.

We claim:

1. Image recognition apparatus for recognizing a condition of a candidate article with respect to a reference condition, said apparatus comprising:
   first memory means for storing a bi-level reference image;
   display means connected to said first memory means for displaying said reference image;
   selecting means connected to said first memory means and said display means for manually designating a plurality of selected reference points of said reference image;
   detecting means that has at least one adjustable parameter and is connected to said selecting means for detecting signal levels at each of said reference points;
   second memory means connected to said detecting means for storing said detected signal levels; and
   comparison means connected to said second memory means for making a comparison of said detected signal levels with bi-level signals at points that correspond to said reference points but are proper to a bi-level candidate image corresponding to a candidate article;
   said comparison indicating a condition of said candidate article with respect to a corresponding condition of said reference image, and said display means displaying the results of said comparison;
   wherein each of said points correspond to a plurality of picture elements and said detecting means comprises means for adjustably assigning relative weights to said picture elements.

2. Image recognition apparatus according to claim 1, further comprising:
   scanning means for scanning a candidate article and a reference article and generating image signals corresponding thereto; and
   bi-level converting means coupled to said scanning means for converting said image signals into said bi-level signals.

3. Image recognition apparatus according to claim 1, wherein said selecting means includes means for manually defining an absolute position of said reference image and an associated first set of selected reference points, for indicating an absolute position of said candidate image, and for automatically defining an associated second set of selected reference points, the reference points of said second set respectively corresponding to the reference points of the said first set, whereby the comparison made by said comparison means is indicative of the identity or non-identity of said candidate image with respect to said reference image.

4. Image recognition apparatus according to claim 1, wherein said selecting means includes calculating means for defining a center of gravity of said candidate article, and said points corresponding to said reference points are selected with respect to said center of gravity.

5. Image recognition apparatus according to claim 1, wherein said selecting means includes calculating means for defining a center of gravity and principal axis of inertia of said candidate article, and said points corresponding to said reference points are selected with respect to said center of gravity and principal axis of inertia.

* * * * *